(12) United States Patent
Hu et al.

(10) Patent No.: US 12,374,139 B2
(45) Date of Patent: Jul. 29, 2025

(54) GENERATING SYNTHETIC TRAINING DATA INCLUDING DOCUMENT IMAGES WITH KEY-VALUE PAIRS

(71) Applicant: Oracle International Corporation, Redwood Shores, CA (US)

(72) Inventors: Yazhe Hu, Seattle, WA (US); Tao Sheng, Bellevue, WA (US); Jun Qian, Bellevue, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 355 days.

(21) Appl. No.: 18/058,982

(22) Filed: Nov. 28, 2022

(65) Prior Publication Data

US 2024/0177511 A1    May 30, 2024

(51) Int. Cl.
*G06V 30/19* (2022.01)
*G06V 30/148* (2022.01)
*G06V 30/41* (2022.01)

(52) U.S. Cl.
CPC ...... *G06V 30/19147* (2022.01); *G06V 30/153* (2022.01); *G06V 30/41* (2022.01)

(58) Field of Classification Search
CPC ............ G06N 20/00; G06N 3/04; G06N 3/08; G06N 5/04; G06F 16/28; G06F 16/35; G06F 17/00; G06F 40/00; G06F 40/117; G06F 40/169; G06F 40/186; G06Q 30/06; G06V 30/19147; G06V 30/153; G06V 30/41; G06V 30/10
USPC ......................................................... 382/159
See application file for complete search history.

(56) References Cited

U.S. PATENT DOCUMENTS

| | | | |
|---|---|---|---|
| 9,104,940 B2* | 8/2015 | Wu .................... | G06V 30/15 |
| 10,546,054 B1* | 1/2020 | Foroughi ............... | G06N 20/00 |
| 11,087,081 B1* | 8/2021 | Srivastava ............ | G06F 40/169 |
| 11,210,507 B2* | 12/2021 | Ayyadevara ......... | G06V 30/413 |
| 11,341,367 B1* | 5/2022 | Barbosa .............. | G06F 18/2148 |

(Continued)

OTHER PUBLICATIONS

"Synthetic Invoice Dataset Generator", Provectus, Available Online at: https://provectus.com/wpcontent/uploads/2021/11/synthetic_compressed.pdf, 2021, 6 pages.

(Continued)

*Primary Examiner* — Akwasi M Sarpong
*Assistant Examiner* — Pawan Dhingra
(74) *Attorney, Agent, or Firm* — Kilpatrick Townsend & Stockton LLP

(57) ABSTRACT

Automated techniques are for generating a large volume of diverse training data that can be used for training machine learning models to extract KV pairs from document images. Given a single input document image and associated annotation data, a large number of diverse synthetic training datapoints are automatically generated by a synthetic data generation system, each datapoint including a synthetic document image and associated annotation data. The generated synthetic training datapoints can be used to train and improve the performance of ML models for extracting KV pairs from document images. In certain implementations, multiple synthetic datapoints are generated by varying the values associated with a key for a content item within the input document image.

20 Claims, 22 Drawing Sheets

(56) References Cited

U.S. PATENT DOCUMENTS

| | | | | |
|---|---|---|---|---|
| 11,495,014 | B2* | 11/2022 | Bhaskar | G06F 18/28 |
| 11,694,354 | B2* | 7/2023 | Strong | G06T 11/203 |
| | | | | 382/157 |
| 11,798,301 | B1* | 10/2023 | Rimchala | G06V 30/19147 |
| 2008/0310721 | A1* | 12/2008 | Yang | G06V 30/182 |
| | | | | 382/182 |
| 2012/0173504 | A1* | 7/2012 | Moraleda | G06F 40/284 |
| | | | | 707/723 |
| 2020/0125929 | A1* | 4/2020 | Guo | G06V 20/188 |
| 2020/0125954 | A1 | 4/2020 | Truong et al. | |
| 2020/0320289 | A1* | 10/2020 | Su | G06V 30/413 |
| 2021/0019804 | A1* | 1/2021 | Truong | G06N 5/04 |
| 2021/0089811 | A1* | 3/2021 | Strong | G06V 20/176 |
| 2021/0158093 | A1* | 5/2021 | Kaynig-Fittkau | G06V 10/82 |
| 2021/0182548 | A1* | 6/2021 | Ayyadevara | G06V 30/18057 |
| 2022/0044058 | A1 | 2/2022 | Zhang et al. | |
| 2022/0058437 | A1* | 2/2022 | Soni | G06F 18/214 |
| 2022/0121932 | A1* | 4/2022 | Kalarot | G06F 3/04847 |
| 2022/0156490 | A1* | 5/2022 | Matiukhov | G06F 18/40 |
| 2024/0331423 | A1* | 10/2024 | Zeng | G06V 30/413 |
| 2024/0371190 | A1* | 11/2024 | Lu | G06F 40/174 |

OTHER PUBLICATIONS

Blanchard et al., "Automatic Generation of a Custom Corpora for Invoice Analysis and Recognition", International Conference on Document Analysis and Recognition Workshops (ICDARW), Jan. 30, 2020, 5 pages.

* cited by examiner

RESTORAN WAN CHENG
002043319-W
No.2, Jalan Temenggung 19/9,
Seksyen 9, Bandar Mankota Cheras,
43200 Cheras Selangor
GS REG NO: 001335787520

Tax Invoice

INV No.: 1053110  Cashier : Thandar
Date    : 19-03-2022  18:08:38

| Description | Qty | U.price | Total | TAX |
|---|---|---|---|---|
| Milo (B) | 2 x | 2.80 | 5.60 | SR |
| Take Away | 2 x | 0.20 | 0.40 | SR |

Total QTY: 4
Total (Excluding GST) :           5.66
GST payable (6%) :                0.34
Total (Inclusive of GST) :        6.00
TOTAL:                      6.00

CASH :                            6.00

| GST Summary | Amount (RM) | Tax (RM) |
|---|---|---|
| SR  (@ 6%) | 5.66 | 0.34 |

← 404

408, 410 → (labels)
406 → (label)
400 → (label)

GENERATING SYNTHETIC TRAINING DATA INCLUDING DOCUMENT IMAGES WITH KEY-VALUE PAIRS

BACKGROUND

Extracting meaningful content, such as key-value (KV) pairs, from document images is performed in several applications and business processes, but is a non-trivial task. More recently, trained machine learning (ML) models are being used to automate the extraction of KV pairs from document images.

For example, an ML model may be trained to identify and extract KV pairs from document images, e.g., images of the documents. A KV pair includes two related data elements: (a) a key, and (b) a value for the key. In a KV pair, the "key" identifies or defines a category. The "value" associated with a key identifies a value for the category represented by the key. Multiple KV pairs can have the same key but different associated values. Accordingly, one or more values may be associated with a particular key.

In implementations where an ML model is used to extract KV pairs from a document image, the ML model has to be first trained using training data. A trained model can then be used to extract KV pairs from real document images.

The performance of an ML model is only as good as its training. To properly train a model that can accurately and reliably extract KV pairs from document images, a large amount of training data is needed to ensure that the model is accurate and reliable in extracting KV pairs from document images. The training data also has to be diverse covering various situations and different types of document images and different types of KV pairs. The availability of such training data is presently very limited. There are several reasons for this. A large volume of diverse training document images is not easily available. Additionally, each training document image has to be annotated. These annotations are typically done manually. This is a very tedious and time-consuming task.

As a result, training data that is typically available for training models to extract KV pairs from document images is limited and non-diverse, leading to deficient training of the ML models, which in turn leads to degraded performance (e.g., accuracy) of the models. While efforts are being made to increase both the volume and quality of such training data using automated techniques, these efforts are still quite deficient, very time and resource intensive, and not scalable. These limitations present a big hurdle in generating accurate and reliable models for extracting KV pairs from document images.

SUMMARY

The present disclosure relates generally to automated techniques for generating training data that can be used for training machine learning models, to obtain trained models capable of processing document images, e.g., extracting KV pairs from the document images. More particularly, techniques are described for automatically, and substantially without human intervention, generating training data where the training data includes a set of training images, which contain synthetic text content, and corresponding annotation data. Various embodiments are described herein, including methods, systems, non-transitory computer-readable storage media storing programs, code, or instructions executable by one or more processors, and the like.

In certain implementations, a method is provided. The method includes obtaining, by a synthetic data generation system (SDGS), a result of performing optical character recognition (OCR) on an input document image including a plurality of content items having a plurality of values, respectively. The result including information indicative of the plurality of values and information identifying, for each of the plurality of values, a location within the input document image of a content item from the plurality of content items that corresponds to a value of the plurality of values, where the plurality of content items includes a first content item and the plurality of values includes a value corresponding to the first content item. The method further includes receiving, by the SDGS, an annotation to the result, the annotation indicating that the value from the plurality of values is associated with a first key; and determining, by the SDGS, a plurality of synthetic values for the first key, the plurality of synthetic values including a first synthetic value different from the value and a second synthetic value different from the value and from the first synthetic value. A plurality of synthetic document images is generated and includes a first synthetic document image including a first set of content items including the first content item and one or more second content items from the plurality of content items, where the first synthetic document image includes the first synthetic value for the first content item, and, for the one or more second content items, one or more second values from the plurality of values that correspond to the one or more second content items and were included in the input document image, and a second synthetic document image including a second set of content items including the first content item and one or more third content items from the plurality of content items, where the second synthetic document image includes the second synthetic value for the first content item, and, for the one or more third content items, one or more third values from the plurality of values that correspond to the one or more third content items and were included in the input document image. A plurality of annotation data for the plurality of synthetic document images is generated and includes first annotation data for the first synthetic document image, the first annotation data including, for each content item in the first set of content items, information indicative of a corresponding value included in the first synthetic document image, and information identifying a corresponding location within the first synthetic document image of the content item, and second annotation data for the second synthetic document image, the second annotation data including, for each content item in the second set of content items, information indicative of a corresponding value included in the second synthetic document image, and information identifying a corresponding location within the second synthetic document image of the content item.

In some embodiments, the determining the plurality of synthetic values includes determining the first synthetic value and the second synthetic value using a key-value (KV) content database that stores a plurality of historical values, where each of the plurality of historical values in the KV content database is associated with one of a plurality of historical keys, to form historical KV pairs, and the first key is one of the plurality of historical keys.

In some embodiments, the method further includes searching the KV content database to identify historical values corresponding to the first key among the plurality of historical values, where the first synthetic value and the second synthetic value are the identified historical values.

In some embodiments, the receiving the annotation to the result includes receiving a plurality of annotations, the plurality of annotations indicating that values corresponding to some of the plurality of content items are associated with a plurality of particular keys, and the method further includes, prior to the determining the plurality of synthetic values for the first key, receiving, by the SDGS, a user input for specifying the first key as a key for which the plurality of synthetic values are to be determined and the plurality of synthetic document images are to be generated.

In some embodiments, the method further includes generating a plurality of synthetic training datapoints, each of the plurality of synthetic training datapoints including a corresponding synthetic document image among the plurality of synthetic document images and associated annotation data among the plurality of annotation data.

In some embodiments, the method further includes receiving, by the SDGS, a user input for specifying a number of the plurality of synthetic training datapoints to be generated.

In some embodiments, the generating the plurality of synthetic document images includes inserting, into at least one from among the first synthetic document image and the second synthetic document image, a background image.

In some embodiments, the background image is a logo.

In some embodiments, the generating the plurality of synthetic document images includes changing, for at least one from among the first synthetic document image and the second synthetic document image, at least one from among a font size and a font style.

In some embodiments, the input document image includes one from among a receipt image and an invoice image, and the generating the plurality of synthetic document images includes generating the plurality of synthetic document images corresponding to the one from among the receipt image and the invoice image.

In some embodiments, the obtaining the result of the OCR on the input document image includes receiving the input document image including the plurality of content items as text; dividing the text into text units by performing the OCR on the text, each of the text units corresponding to one of the plurality of content items and is enclosed by a bounding box; extracting the text units and location information of four corners of each bounding box as the locations of the plurality of content items, respectively; and obtaining an OCR image including rows, each of the rows including one of the plurality of content items and location information corresponding to the one of the plurality of content items.

In some embodiments, the receiving the annotation includes obtaining the OCR image to which the first key is added in correspondence to the first content item located in one of the rows.

In some embodiments, the method further includes, prior to the generating the plurality of synthetic document images, generating, by the SDGS, a template based on the OCR image to which the first key is added, the generating the template including masking the value corresponding to the first content item in the one of the rows, and generating the template including, in the one of the rows, the first key, an empty value field corresponding to the masked value, and location information corresponding to the first content item, where the generating the first synthetic document image includes associating the first synthetic value with the empty value field, to generate a first synthetic template, based on which the first synthetic document image is generated, and associating the second synthetic value with the empty value field, to generate a second synthetic template, based on which the second synthetic document image is generated.

In some embodiments, the generating the plurality of synthetic document images includes generating the plurality of synthetic document images in parallel, partially in parallel, or successively.

In certain implementations, a non-transitory computer-readable medium is provided. The non-transitory computer-readable medium stores computer-executable instructions that, when executed by one or more computer systems of a synthetic data generation system (SDGS), cause the SDGS perform a method including obtaining a result of performing optical character recognition (OCR) on an input document image including a plurality of content items having a plurality of values, respectively, the result including information indicative of the plurality of values and information identifying, for each of the plurality of values, a location within the input document image of a content item from the plurality of content items that corresponds to a value of the plurality of values, where the plurality of content items includes a first content item and the plurality of values includes a value corresponding to the first content item. The method further includes receiving an annotation to the result, the annotation indicating that the value from the plurality of values is associated with a first key; and determining a plurality of synthetic values for the first key, the plurality of synthetic values including a first synthetic value different from the value and a second synthetic value different from the value and from the first synthetic value. A plurality of synthetic document images is generated and includes a first synthetic document image including a first set of content items including the first content item and one or more second content items from the plurality of content items, where the first synthetic document image includes the first synthetic value for the first content item, and, for the one or more second content items, one or more second values from the plurality of values that correspond to the one or more second content items and were included in the input document image, and a second synthetic document image including a second set of content items including the first content item and one or more third content items from the plurality of content items, where the second synthetic document image includes the second synthetic value for the first content item, and, for the one or more third content items, one or more third values from the plurality of values that correspond to the one or more third content items and were included in the input document image. A plurality of annotation data for the plurality of synthetic document images is generated and includes first annotation data for the first synthetic document image, the first annotation data including, for each content item in the first set of content items, information indicative of a corresponding value included in the first synthetic document image, and information identifying a corresponding location within the first synthetic document image of the content item, and second annotation data for the second synthetic document image, the second annotation data including, for each content item in the second set of content items, information indicative of a corresponding value included in the second synthetic document image, and information identifying a corresponding location within the second synthetic document image of the content item.

In certain implementations, a system is provided. The system includes one or more computer systems configured to perform a method including obtaining a result of performing optical character recognition (OCR) on an input document image including a plurality of content items having a plurality of values, respectively, the result including information indicative of the plurality of values and information identifying, for each of the plurality of values, a location within the input document image of a content item from the plurality of content items that corresponds to a value of the plurality of values, where the plurality of content items includes a first content item and the plurality of values includes a value corresponding to the first content item. The method further includes receiving an annotation to the result, the annotation indicating that the value from the plurality of values is associated with a first key; and determining a plurality of synthetic values for the first key, the plurality of synthetic values including a first synthetic value different from the value and a second synthetic value different from the value and from the first synthetic value. A plurality of synthetic document images is generated and includes a first synthetic document image including a first set of content items including the first content item and one or more second content items from the plurality of content items, where the first synthetic document image includes the first synthetic value for the first content item, and, for the one or more second content items, one or more second values from the plurality of values that correspond to the one or more second content items and were included in the input document image, and a second synthetic document image including a second set of content items including the first content item and one or more third content items from the plurality of content items, where the second synthetic document image includes the second synthetic value for the first content item, and, for the one or more third content items, one or more third values from the plurality of values that correspond to the one or more third content items and were included in the input document image. A plurality of annotation data for the plurality of synthetic document images is generated and includes first annotation data for the first synthetic document image, the first annotation data including, for each content item in the first set of content items, information indicative of a corresponding value included in the first synthetic document image, and information identifying a corresponding location within the first synthetic document image of the content item, and second annotation data for the second synthetic document image, the second annotation data including, for each content item in the second set of content items, information indicative of a corresponding value included in the second synthetic document image, and information identifying a corresponding location within the second synthetic document image of the content item.

The foregoing, together with other features and embodiments will become more apparent upon referring to the following specification, claims, and accompanying drawings.

BRIEF DESCRIPTION OF THE DRAWINGS

FIG. 4A depicts an example of an input document image according to certain embodiments.

FIG. 4C depicts an example of an optical character recognition (OCR) result according to certain embodiments.

FIG. 5 depicts an example of a template according to certain embodiments.

FIG. 6A depicts an example of a synthetic template according to certain embodiments.

FIG. 6C depicts an example of a synthetic template according to certain embodiments.

DETAILED DESCRIPTION

Figure 1:
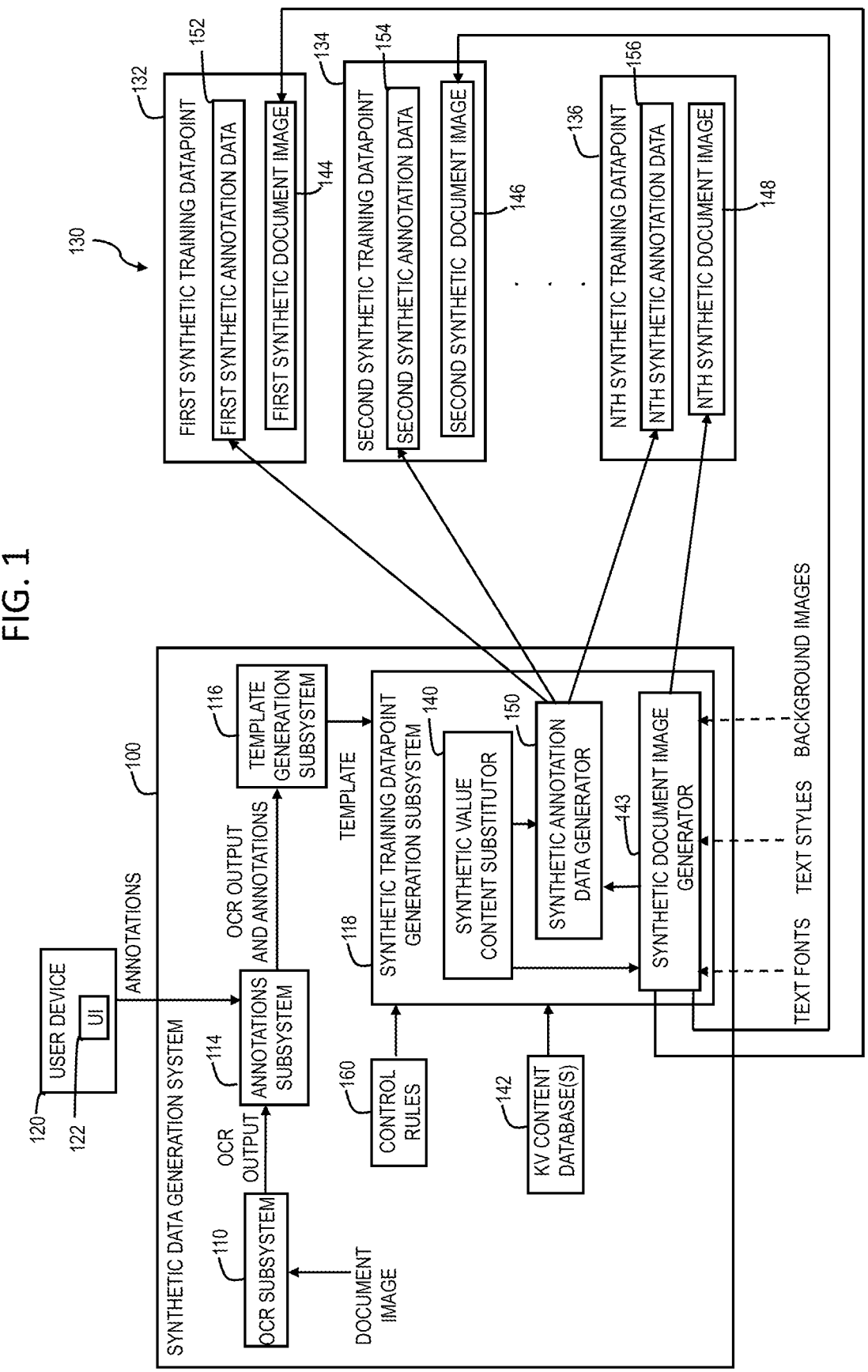
FIG. 1 is a simplified block diagram of a synthetic data generation system (SDGS) according to an embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates generally to automated techniques for generating a large volume of diverse training data that can be used for training machine learning models to extract KV pairs from document images. More particularly, techniques are described for, given a document image, automatically, and substantially without human intervention, generating synthetic training data based upon the given document image, where the training data includes a large volume of training document images and associated annotation data. Various embodiments are described herein, including methods, systems, non-transitory computer-read- Automated techniques are disclosed for generating a large volume of diverse training data that can be used for training machine learning models to extract KV pairs from document images. Given a single input document image and associated annotation data, a large number of diverse synthetic training datapoints is automatically generated by a synthetic data generation system, each datapoint including a synthetic document image and associated annotation data. The generated synthetic training datapoints can be used to train and improve the performance of ML models for extracting KV pairs from document images. In certain implementations, multiple synthetic datapoints are generated by varying the values associated with a key for a content item within the input document image.

A KV pair includes two related textual data elements: (a) a key, and (b) a value for the key. In a KV pair, the "key" identifies or defines a category. The "value" associated with a key identifies a value for the category represented by the key. Multiple KV pairs can have the same key but different associated values. Accordingly, one or more values may be associated with a particular key.

In certain implementations, techniques described herein automatically generate a large number of synthetic KV training data with high quality and diversity to improve the training of ML models that are trained to perform KV pairs extraction from document images. The training data that is generated is referred to as synthetic training data because it is computer-generated using a computer algorithm. The generated synthetic training data includes synthetic training images, and for each synthetic training image, annotation data indicative of locations of one or more KV pairs in the synthetic training document image, and for each KV pair, information identifying the key portion of the KV pair and associated value. Since both the training images and the associated annotation data are generated automatically, and substantially free of any manual intervention, a large amount of accurate and diverse training data can be generated efficiently in a very quick time. This dramatically, and by an order of several magnitudes, increases the amount of training data that is available for training machine learning models, such as for models that are to be trained for KV pairs extraction from document images. The availability of a large volume of diverse training data helps a data scientist develop better trained models models that are more accurate and more reliable.

As indicated in the Background section, extracting content from document images is a non-trivial task. The task is even more difficult for extracting KV pairs. For purposes of this disclosure, a document image is an imaged-based document including pixels. A document image may be generated using an imaging device such as a scanner (e.g., by scanning a document) or a camera (e.g., by a camera capturing an image of a document), and the like. A document image is different from a text-based document, which is a document created using a text editor (e.g., Microsoft WORD, EXCEL) and in which the contents of the document, such as words, tables, etc., are preserved in the document and are easily extractable from the document. In contrast, in a document image, the words, tables, etc., are lost and not preserved-instead, a document image includes pixels and the contents of the document are embedded in the values of the pixels. Examples of document images include without limitation an image of a receipt containing multiple text lines (e.g., a list of items with corresponding quantities, and prices), an electronically scanned page of a book or article, and the like. Different file formats may be used to store documents images. Some examples include files with ".jpeg", ".gif", ".png", or ".tiff" file name extensions.

As mentioned in the Background section, extracting and interpreting KV pairs from various document images (e.g., images of invoices, pay stubs, purchase receipts, and the like) is useful for various applications. For example, an accounting reimbursement software may extract KV pairs from images of receipts (e.g., a photo of a dinner receipt taken by an employee using a cellphone and submitted to the company for reimbursement). As part of the reimbursement process, the accounting software may extract several KV pairs from the receipt photo such as: the name of the restaurant, the date, telephone number of the restaurant, food items ordered by the employee and their associated dollar values, the total and its corresponding dollar value, etc.

Within a document image, KV pairs may be indicated using different formats. Some examples of KV pairs include:
Color=Red—Here "Color" is the key and "Red" is the value for the key.
(Merchant, Costco)—Here "Merchant" is the key and "Costco" is the value.
Merchant: Samsung—Here "Merchant" is the key and "Samsung" is the value.
Time 10 PM—Here "Time" is the key and "10 PM" is the value.
Weight >200 lbs—Here "Weight" is the key and "200 lbs" is the value.

As can be seen above, various different formats may be used to represent a KV pair in a document image.

The extraction of KV pairs from a document image typically involves performing OCR on the document image, identifying keys and values from the OCRed content, and then correlating keys with their corresponding values. These tasks are difficult to automate.

As mentioned above in the Background section, the ML models are now being increasingly used to automate the extraction of KV pairs from document images. Any such model has to be first trained using training data. A trained model can then be used to extract KV pairs from real data. The performance of a model is only as good as its training. To properly train a model that can accurately and reliably extract KV pairs from document images, a large volume of training data including training datapoints is needed for training the model, where each training datapoint includes a training image and associated annotations identifying one or more KV pairs in the document image, their locations in the document image, and for each KV pair, information identifying the key and the associated value. The training data also has to be diverse, to cover various situations. This includes images with different background and foreground colors and scenes, fonts of different shapes and sizes and orientation, presence of tables, and the like.

Presently, the training data mentioned above is typically prepared manually. For example, given a document image, the annotations for that image are done manually, where the annotation data for a document image indicates locations of one or more KV pairs in the document image, and for each KV pair, information identifying the key portion of the KV pair and associated value. Each datapoint (e.g., a training data document image) in the training dataset has to be manually annotated. This makes the generation of training data a long, tedious, and time consuming process. As a result, large volumes of diverse training data is scarce. Further, if the data scientist wants to make changes to previously-prepared training data, these changes also take a long time to be implemented.

Generation of the training data is thus a painstaking and tedious job taking a lot of time and computational resources. Further, the number of training datapoints is also very limited. Thus, training datasets suffer from deficiencies including insufficient number of training datapoints and lack of diversity in the training datapoints. In addition, the human annotators are prone to mistakes. Use of such deficient training datasets leads to models that are inaccurate and unreliable.

Further, the manually-annotated training data corresponding to the training datapoints need to forego additional processing such that the annotations are converted into machine-readable format. Such processing consumes storage space and computational resources of the computer system.

The present disclosure describes solutions for generating training data that are not plagued by the above-mentioned problems. Techniques are described for automatically generating a large number of diverse synthetic training datapoints that can be used for training ML models to perform the task of extracting KV pairs from document images. In certain implementations, given a single input document image and KV pair-related annotations provided for that image, the techniques described herein can be used to automatically, and substantially free of any human intervention, generate a large number of synthetic training datapoints (e.g., in the hundreds, in the thousands, in the tens of thousands, or even higher) and associated annotation data, based upon the single annotated document image. The KV pair-related annotations for the input document image can be provided manually. For example, the input document image may be an image of a real-world document such as a receipt. Manual annotations may be provided identifying the location and contents of one or more KV pairs in the input document image. In alternative embodiments, the input document image may itself be a synthetically generated document image and associated annotation data. Since just one annotated document image can be used to automatically generate a large number of synthetic training datapoints, all the problems of manually annotating a large number of training images are eliminated.

In certain implementations, an input document image is provided as input to a synthetic data generation system. The input document image may include multiple content items. The synthetic data generation system performs OCR processing on the input document image. The OCR processing extracts the contents of the input document image in the form of text content items. An extracted content can be a word or a sequence of words in the input document image. The output of the OCR processing is a document that includes information about the various content items extracted from the input document image. In certain implementations, the OCR output document includes, for each extracted content item, information identifying the location of the content item within the input document image, and a value (in text form) corresponding to the content item (e.g., a word, a sequence of words, a numerical value, etc. corresponding to the extracted content item).

A user is then allowed to annotate the OCR output document to indicate which of the extracted content items are to be treated as KV pairs. For each content item to be treated as a KV pair, the user can annotate the OCR output document and indicate a particular key for that content item. In this manner, a user can manually annotate the OCR output document to identify one or more content items to be treated as KV pairs. In some embodiments, the synthetic data generation system may provide an interface (e.g., a user interface) that enables a user of the system to annotate the OCR output to indicate which of the content items are to be treated as KV pairs. Since the user identifies, via the annotations, which specific content items are to be treated as KV pairs, the user has complete control over the synthetic training data generation process.

In some other embodiments, the input document image may be an image for which annotation data is already available. The annotation data for the input document image may identify a set of content items in the input document image, and for each content item, the location of the content item within the document image and the content value of the content item, and additionally, information identifying which of the content items are to be treated as KV pairs, and the key for each such content item. In this scenario, the user does not perform any annotations.

A template is then generated by the synthetic data generation system based upon the annotated OCR output. In the template, for those content items in the OCR output that are annotated to be treated as a KV pair, the content value portions of the content item are masked or identified as a field to be varied. For example, for a content item marked to be treated as a KV pair, the value portion of the content item in the OCR output may be left empty or indicated as a field to be filled in (or designated or masked in some manner). This is so that the content item and the field is easily identifiable by the synthetic data generation processing. This field is then filled in with variable synthetic values corresponding to associated key during the synthetic training data generation processing.

The template is then used by the synthetic data generation system to generate multiple synthetic training images and associated annotation data. This is done by populating the masked value fields of the template with the varying synthetic values for the corresponding keys. For example, in the template, a particular content item C1 with a masked value field may be annotated to be considered as a KV pair and a "Merchant Name" category may be associated with it. A first value MN1 may be obtained for the Merchant Name category. A first synthetic training image S1 may be generated using the template, where the contents of S1 are same as the input document image except that the value for C1 is now MN1 instead of the original value in the input document image. This is possible because the template identifies the various content items extracted from the input document image and their locations. The annotated OCR output may also be used to generate annotation data for synthetic document image S1, where the annotation data indicates a value of MN1 for C1. For the same content item C1, a second value MN2 may be obtained for the Merchant Name category, where MN2 is different from MN1. A second synthetic training image S2 may be generated using the template, where the contents of S2 are same as the input document image except that the value for C2 is now MN2 instead of the original value in the input document image. The annotated OCR output may also be used to generate annotation data for synthetic document image S2, where the annotation data indicates a value of MN2 for C1. In this manner, multiple training datapoints, each datapoint including a document image and associated annotation data, may be generated simply by using different values for the key Merchant Name. If the template indicates multiple content items that are to be treated as KV pairs, various permutations and combinations of different values for the different keys corresponding to those content items may be used to generate multiple synthetic training datapoints.

The synthetic values for a particular key may be obtained from various publicly or privately accessible information sources storing values for that key category. Examples of sources can include one or more key-value content databases storing values for a set of keys. For example, if the key indicates a Merchant Name, the different values of merchant names can be obtained from various databases storing merchant names and addresses. Online information sources, such as Wikipages, online databases, etc. may also be used.

Based on the plurality of synthetic templates, a plurality of synthetic document images corresponding to a plurality of synthetic training datapoints may be generated.

In some implementations, various different properties of the synthetic document images may be manipulated and varied to generate additional training datapoints. For example, properties of a document image that can be varied may include without limitation: the font used for displaying the value of the KV pair, the size of the font, a style used to display the value (e.g., bolding, italicizing, underlining), a background of the document image (e.g., colored, black and white, different backgrounds), etc. to provide even more diversity in the synthetic training datapoints that are generated.

The techniques described herein also offer great flexibility and control in the generation of the synthetic training dataset. For example, a data scientist can set up rules or configuration information for the synthetic data generation system to control various aspects of the synthetic training data generation process, such as: the number of synthetic training datapoints to be generated; restrictions on values to be used for one or more keys (e.g., restrict the values to be used for a particular to be within a certain range (or ranges) or to have particular values); identifying specific keys, from multiple keys, whose values are to be varied during a particular synthetic training data generation run; the document image related properties to be varied (e.g., font, font size, style, background, etc.); the information sources to be used for obtaining the variable values for the keys; and other user-controllable parameters. In this manner, the user of the synthetic data generation system (e.g., a data scientist) has control over the quantity, the diversity, and characteristics of the synthetic training data that is generated by the synthetic data generation system.

In some implementations, the synthetic annotation data documents may be generated in correspondence to the plurality of synthetic document images. The synthetic annotation data documents include information describing the synthetic template contents and the synthetic document image contents and attributes, e.g., layout, font size, font style, text style, background, etc. Also, each synthetic annotation data document includes the information indicating associations and relationships between elements in the synthetic template and/or the synthetic document image.

As a result of the processing described above, a plurality of diverse synthetic training datapoints may be generated, each including a synthetic document image and a corresponding synthetic annotation data document. Various different types of training datapoints and training datasets may be automatically generated based upon desired user preferences. For example, as described herein, the generated training synthetic document images may contain only text content or both the text content and image content, where the image content acts as the background to the text content. The font, font sizes, styles, and formats (e.g., paragraphs, line spacing, borders, etc.) used for generating the synthetic training images may be randomly varied to create diversity. Accordingly, as described herein, the synthetic training datapoints having great diversity can be automatically generated. This diversity in the training dataset translates to training that generates a model that is more universally applicable, accurate, and robust in various use cases.

In certain implementations, the novel synthetic data generation techniques described herein can be used by a CSP to provide services to its customers. For example, a customer may subscribe to a particular service. As a part of the service, the CSP may provide one or more prebuilt models for that service that have been trained by the CSP using the synthetic training datapoints. For example, the prebuilt model may be trained to extract KV pairs and make predictions regarding duplicate invoices at high levels of accuracy.

In certain implementations, the novel training techniques described herein themselves can be offered as a cloud service (e.g., a "dataset generation" service) by a CSP. The "dataset generation" service can be subscribed to by one or more customers of the CSP. For example, a subscribing customer may provide an input document image, annotations, and a selection of keys. The CSP may, as a part of the service, generate a training dataset according to the input document image and the selected keys.

FIG. 1 is a simplified block diagram of a synthetic data generation system (SDGS) 100 according to certain embodiments. The SDGS 100 may be implemented using one or more computer systems, each computer system having one or more processors. The SDGS 100 may include multiple components and subsystems communicatively coupled to each other via one or more communication mechanisms. For example, in the embodiment depicted in FIG. 1, the SDGS 100 includes an OCR subsystem 110, an annotations subsystem 114, a template generation subsystem 116, and a synthetic training datapoint generation subsystem 118. These subsystems may be implemented as one or more computer systems. The systems, subsystems, and other components depicted in FIG. 1 may be implemented in software (e.g., code, instructions, program) executed by one or more processing units (e.g., processors, cores) of the respective systems, using hardware, or combinations thereof. The software (e.g., computer-executable instructions) may be stored on a non-transitory storage medium (e.g., on a memory device). SDGS 100 depicted in FIG. 1 is merely an example and is not intended to unduly limit the scope of embodiments. Many variations, alternatives, and modifications are possible. For example, in some implementations, SDGS 100 may have more or fewer subsystems or components than those shown in FIG. 1, may combine two or more subsystems, or may have a different configuration or arrangement of subsystems. The SDGS 100 and subsystems depicted in FIG. 1 may be implemented using one or more computer systems, such as the computer system depicted in FIG. 12.

The SDGS 100 is configured to perform processing on an input document image, and output a plurality of synthetic document images based on the input document image, where each of plurality of synthetic document images differs from other synthetic document images at least by one content item corresponding to the given key.

In some implementations, the processing performed by the SDGS 100 includes processing performed by the OCR subsystem 110, the annotations subsystem 114, the template generation subsystem 116, and the synthetic training datapoint generation subsystem 118. Each of the processes and the functions performed by these subsystems are described below in more detail.

The OCR subsystem 110 is configured to receive, as an input, an input document image, perform OCR on the input document image, and output an OCR result. The OCR result is used as an input to the annotations subsystem 114.

Examples of the input document image include images of real-world documents, e.g., invoices, pay stubs, purchase receipts, etc. However, this is not intended to be limiting, and the input document image may include any applicable document where the KV pairs can be identified.

The input document image includes a plurality of content items in a text format, where each of the content items has a value represented by text. The input document image is described in more detail below with reference to FIG. 4A.

Some of the content items in the input document image can be content items of interest, and other content items in the input document image can be content items of no relevance, e.g., the content items that are of no interest. The content items of interest may be categorized by the keys. One key can be a category for a single content item or a plurality of content items.

The OCR subsystem 110 performs processing on the input document image to distinguish the text units. In some embodiments, the OCR subsystem 110 may include a parser which parses the text of the input document image into text units and generates a bounding box that encloses each text unit and has four corners around each text unit. The output of the parser is the OCRed input document image having bounding boxes drawn around the text units, as described in detail below with reference to FIG. 4B. The OCR subsystem 110 extracts, from the input document image having bounding boxes, the text units and location information of four corners of each bounding box, e.g., coordinates, as the locations of content items. As a result of the processing performed by the OCR subsystem 110, the OCR subsystem 110 outputs the OCR result which is an OCR image representing the input document image.

The OCR result (e.g., an OCR image) includes the content items and information identifying, for each of the content items, a location of a content item within the input document image. The OCR image is described in detail below with reference to FIG. 4C.

The annotations subsystem 114 is configured to receive the OCR result from the OCR subsystem 110, obtain an annotated OCR image, and provide the annotated OCR image, as an input, to the template generation subsystem 116. In an example depicted in FIG. 1, the annotations subsystem 114 receives the annotations from a user device 120, e.g., via a user input received through a user interface (UI) 122. The annotations categorize the content items, e.g., the annotations provide keys for some of the content items, where each of the keys is associated with a corresponding value. Accordingly, the annotations subsystem 114 obtains the annotated OCR image, where each particular key is associated with one or more values corresponding to the particular key and where each particular key is defined by a customer (e.g., a user). The annotated OCR image and annotations are described in more detail below with reference to FIGS. 4D and 4E.

The template generation subsystem 116 is configured to receive the annotated OCR image, process the annotated OCR image, and generate a template which is then provided to the synthetic training datapoint generation subsystem 118.

In certain implementations, the template generation subsystem 116 removes or masks at least some of the values, e.g., the content items, from the annotated OCR image, where the empty value fields are generated to be filled with the varying synthetic data.

The template is described in more detail below with reference to FIG. 5.

The synthetic training datapoint generation subsystem 118 is configured to receive the template from the template generation subsystem 116, populate the empty value fields of the template with the varying synthetic values for corresponding keys, and output a plurality of synthetic training datapoints 130 including a first synthetic training datapoint 132, and a second synthetic training datapoint 134 through an Nth synthetic training datapoint 136.

In some implementations, the synthetic training datapoint generation subsystem 118 includes a synthetic value content substitutor 140. The synthetic value content substitutor 140 receives the template from the template generation subsystem 116, and obtains one or more synthetic values from one or more KV content databases 142, where the one or more synthetic values correspond to one or more of the keys designated on the template.

For example, the KV content databases 142 store historical data collected from real-world documents and other sources, e.g., historical values corresponding to historical keys. In the KV content databases 142, each particular historical key and one or more historical values corresponding to the particular historical key are associated with each other. A plurality of entities (e.g., merchants) can have the keys that partially overlap or are the same. For example, each entity, e.g., a merchant, may have a key that is "Merchant Name" and the key "Merchant Name" can have one value or multiple values associated with the key, depending on the merchant. In some embodiments, each particular historical key and one or more historical values corresponding to the particular historical key are associated with each other to form one-to-one relationship, e.g., a single key-single value relationship.

Accordingly, the KV content databases 142 store a plurality of historical values, where each of the plurality of historical values is associated with one of a plurality of historical keys, to form historical KV pairs. A number of historical keys stored in the KV content databases 142 may be greater than a number of keys defined by the customer in the annotations.

The synthetic value content substitutor 140 obtains one or more synthetic values corresponding to one or more historical values stored in the KV content databases 142, where the one or more historical values correspond to one or more historical keys and further correspond to one or more of the keys designated on the template. The synthetic value content substitutor 140 is configured to insert at least one synthetic value into an empty value field of the template, where the empty value field of the template corresponds to a value of a particular key. In the disclosure, the term "insert" is used for descriptive purposes and may mean an insertion or association, e.g., the synthetic value content substitutor 140 may associate or assign at least one synthetic value to an empty value field of the template or to a location of a value to be substituted.

In certain implementations, a user provides, through the user device 120, a selection of one or more keys for which the substitutions are to be made among the keys defined by the user in the annotations.

In some embodiments, based on the user input, the synthetic value content substitutor 140 is configured to perform an operation of variably substituting one or more values corresponding to a particular key, by inserting one or more synthetic values into one or more empty value fields of the template, where a plurality of synthetic templates may be generated, each having one or more synthetic values inserted into corresponding fields of the template that correspond to one or more values. As used herein, the synthetic template may be a non-real document that is computer-generated based on the template in which one or more values corresponding to a particular key are substituted with one or more synthetic values obtained from the KV content database 142 and correspond to a particular key.

In other embodiments, the synthetic value content substitutor 140 is configured to perform an operation of variably substituting some or all values corresponding to the particular keys, by randomly inserting synthetic values into empty value fields of the template, where a plurality of synthetic templates may be generated, each having different synthetic values inserted into the empty data fields of the template that correspond to the same key. For example, each restaurant may have many different receipts. The plurality of different synthetic templates may be generated based on a single template generated by the template generation subsystem 116 based on the annotated OCR image and corresponding to a receipt from the restaurant. The synthetic training datapoint generation subsystem 118 may further include a synthetic document image generator 143. The synthetic document image generator 143 receives the plurality of synthetic templates from the synthetic value content substitutor 140, and, based on the plurality of synthetic templates, generates a plurality of synthetic document images corresponding to the plurality of synthetic training datapoints 130. As exemplary depicted in FIG. 1, the synthetic document image generator 143 generates a first synthetic document image 144, and a second synthetic document image 146 to an Nth synthetic document image 148, respectively corresponding to the first synthetic training datapoint 132, and the second synthetic training datapoint 134 through the Nth synthetic training datapoint 136. Generating of the plurality of synthetic document images includes generating the first synthetic document image 144, and the second synthetic document image 146 to the Nth synthetic document image 148 in parallel, partially in parallel, or successively. The synthetic document images are described in more detail below with reference to FIGS. 6B and 6D.

In some implementations, the synthetic document image generator 143 may further receive an input of at least one of text fonts, text styles, and background images, and change at least one of a text font, a text style, and a background image in one or all of the first synthetic document image 144, and the second synthetic document image 146 to the Nth synthetic document image 148.

Examples of the background images includes a logo, e.g., a logo of a merchant, a color, a texture, an additional image, a borderline, etc.

In certain implementations, text fonts, text styles, and background images in the synthetic document images can be randomized to provide a diversity in the synthetic training datapoints.

In an embodiment depicted in FIG. 1, the synthetic training datapoint generation subsystem 118 includes a synthetic annotation data generator 150. The synthetic annotation data generator 150 receives information about the plurality of synthetic templates from the synthetic value content substitutor 140 and information about the plurality of synthetic document images from the synthetic document image generator 143. Based on the plurality of synthetic templates and the plurality of synthetic document images, the synthetic annotation data generator 150 generates synthetic annotation data corresponding to the plurality of synthetic training datapoints. As used herein, the synthetic annotation data is the computer-generated data formatted into the synthetic annotation document or the synthetic annotation file that is respectively associated with a corresponding synthetic training datapoint.

The synthetic annotation data generator 150 generates each synthetic annotation data document to include the information describing contents of a respective synthetic template and/or a respective synthetic document image. For example, the synthetic annotation data document may include information describing the synthetic template contents and the synthetic document image contents and attributes, e.g., layout, font size, text style, background, etc. Also, each synthetic annotation data document includes the information indicating associations and relationships between elements in the synthetic template and/or the synthetic document image.

As exemplary depicted in FIG. 1, the synthetic annotation data generator 150 generates first synthetic annotation data 152, and second synthetic annotation data 154 to Nth synthetic annotation data 156, respectively corresponding to the first synthetic training datapoint 132, and the second synthetic training datapoint 134 through the Nth synthetic training datapoint 136.

In certain implementations, the synthetic data generation system 100 may include control rules 160. The control rules 160 may include rules applicable to the generation of the plurality of synthetic document images. For example, the control rules 160 may include rules regarding insertion of a background. For example, if the background is a logo, the control rules may include a rule to place the logo on the top of the document, above the first line of the text, or place the logo as the background image while the text content of the synthetic document image is placed as a foreground image and an opacity of the foreground image can be changed to a predetermined value such that the logo is visible on the synthetic document image. The control rules 160 may have rules to add noises to the image, such as pepper-and-salt noise, to mimic real documents and helps the downstream model training task to obtain a more robust model for KV pairs extraction, by using the noisy data. The control rules 160 may also have rules to rotate the generated synthetic contents to certain angles, to mimic the real documents which become slanted or skewed during, e.g., scanning.

Figure 2:
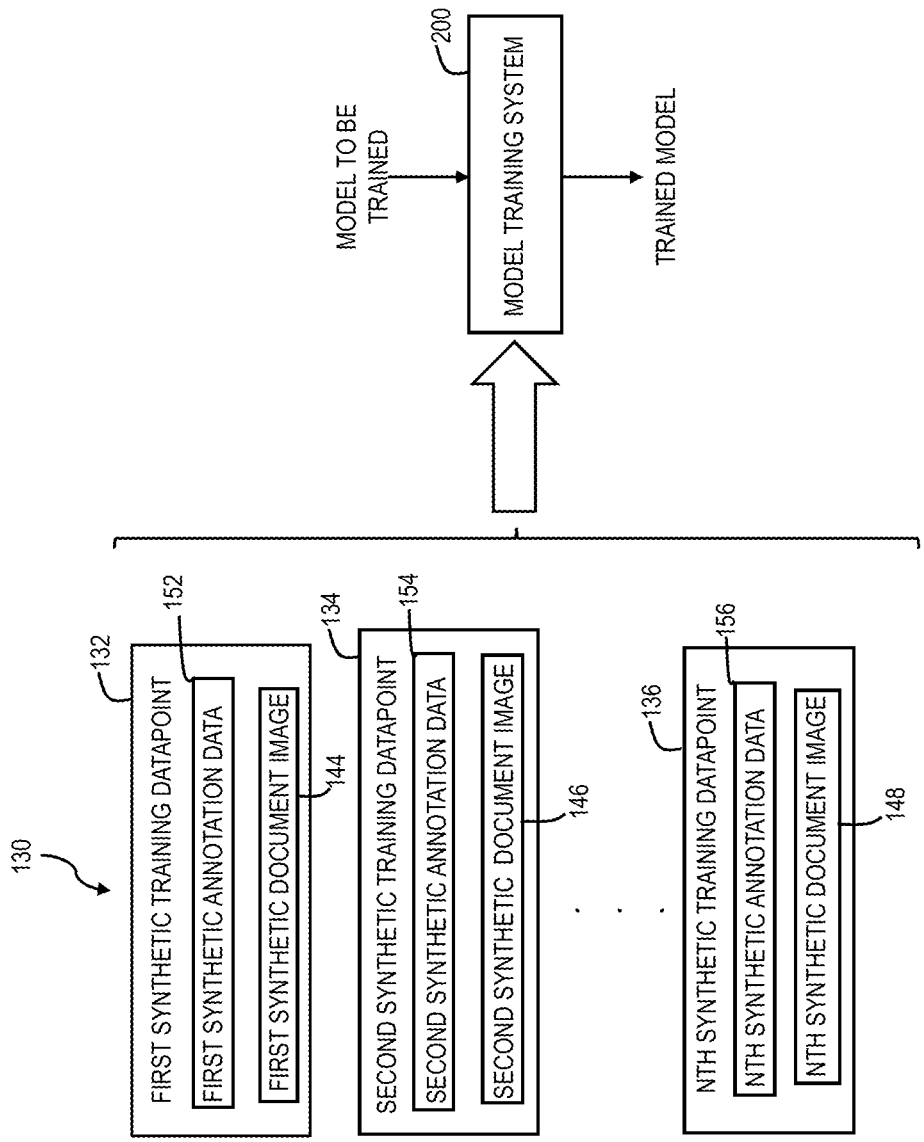
FIG. 2 is a simplified block diagram of a model training system according to certain embodiments.

FIG. 2 is a simplified block diagram of a model training system 200 according to certain embodiments.

The model training system 200 receives, as an input, an untrained model of a desired architecture, and trains the untrained model using the plurality of synthetic training datapoints 130. As a result of the training performed by the model training system 200, a trained model is obtained that can accurately extract KV pairs from the real-world documents, e.g., organize the values of the keys in a template, predict duplicate documents, etc.

Figure 3:
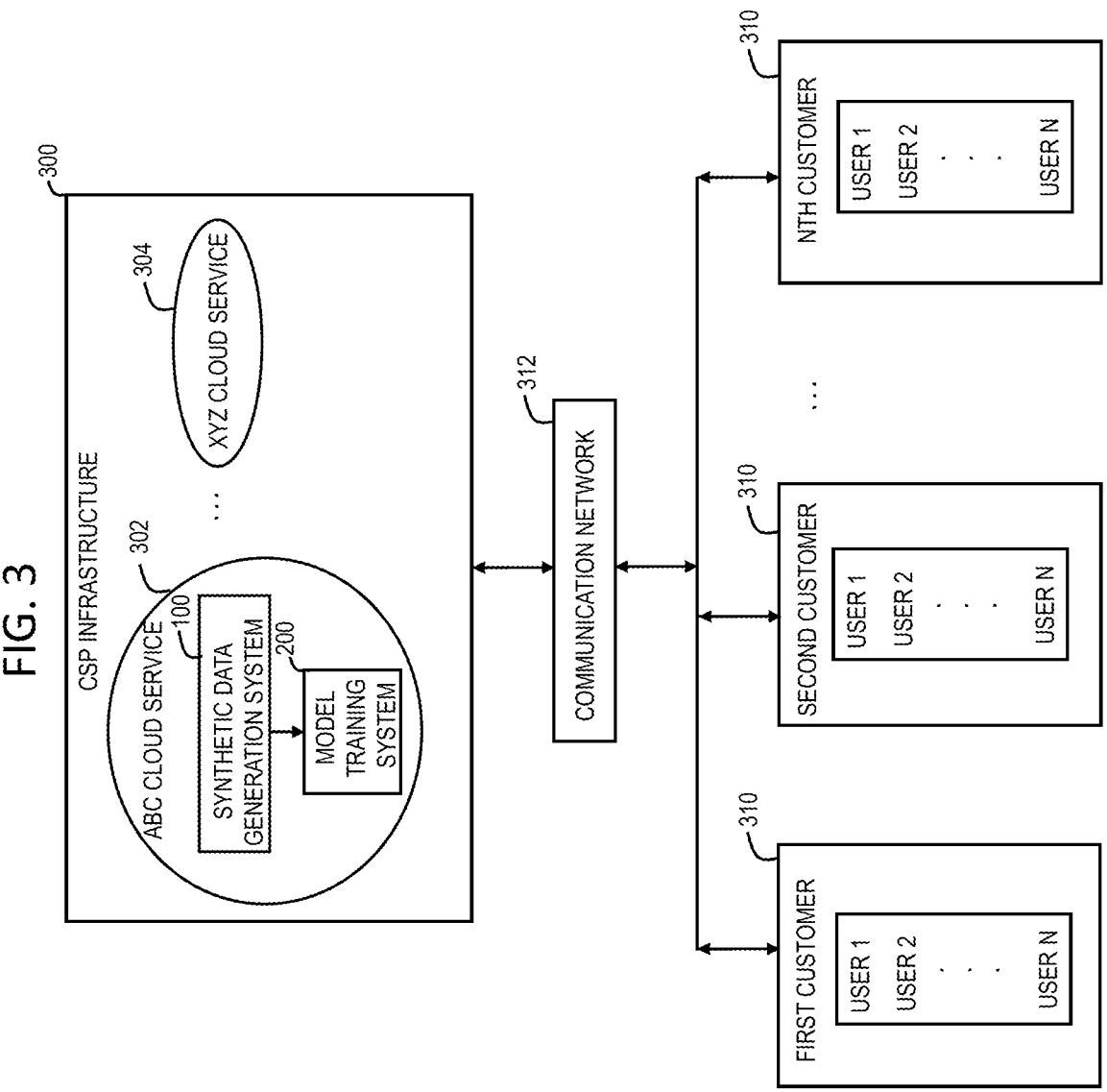
FIG. 3 is a simplified block diagram of an SDGS in a cloud service provider (CSP) infrastructure according to an embodiment.

FIG. 3 is a simplified block diagram of the SDGS 100 implemented in a CSP infrastructure according to an embodiment.

As depicted in FIG. 3, the SDGS 100 may be a part of a CSP infrastructure 300 provided by a CSP for providing one or more cloud services. For example, the one or more cloud services may include ABC cloud service 302 to XYZ cloud service 304 connected to computers of one or more customers 310 via a communication network 312. For example, the SDGS 100 may be a part of the ABC cloud service 302.

For example, the customers 310 may provide real-world documents (e.g., as images, PDF files, etc.) to the CSP infrastructure 300 via the communication network 312. Based on one annotated OCR image, e.g., corresponding to one receipt, the SDGS 100 can generate 1000s of synthetic training datapoints. The synthetic training datapoints can then be provided to the model training system 200 to generate the model capable of analyzing the real-world receipts of that customer. Although the model training system 200 is depicted in FIG. 3 as a part of the cloud service ABC, this is not intended to be limiting. The model training system 200 may be a part of another cloud service, e.g., the cloud service XYZ.

Examples of the cloud infrastructure architecture provided by the CSP are depicted in FIGS. 8-11 and described in detail below.

FIG. 4A depicts an example of an input document image according to certain embodiments.

With reference to FIG. 4A, an input document image 400 is provided as an input to the OCR subsystem 110.

As depicted in FIG. 4A, the input document image 400 is an image of a receipt from the Restaurant "WAN CHENG." However, this is not intended to be limiting and the input document image corresponding to a receipt may be from another entity. Further, in certain implementations, the input document image 400 may be an invoice, a pay stub, etc.

In an embodiment of FIG. 4A, the input document image 400 includes a plurality of rows including a first row 402 to an Nth row 404. One or more content items is arranged in each of the first row 402 to the Nth row 404. For example, the first row 402 in the input document image 400 includes a first content item 406 ("RESTAURANT"), a second content item 408 ("WAN"), and a third content item 410 ("CHENG").

Figure 4B:
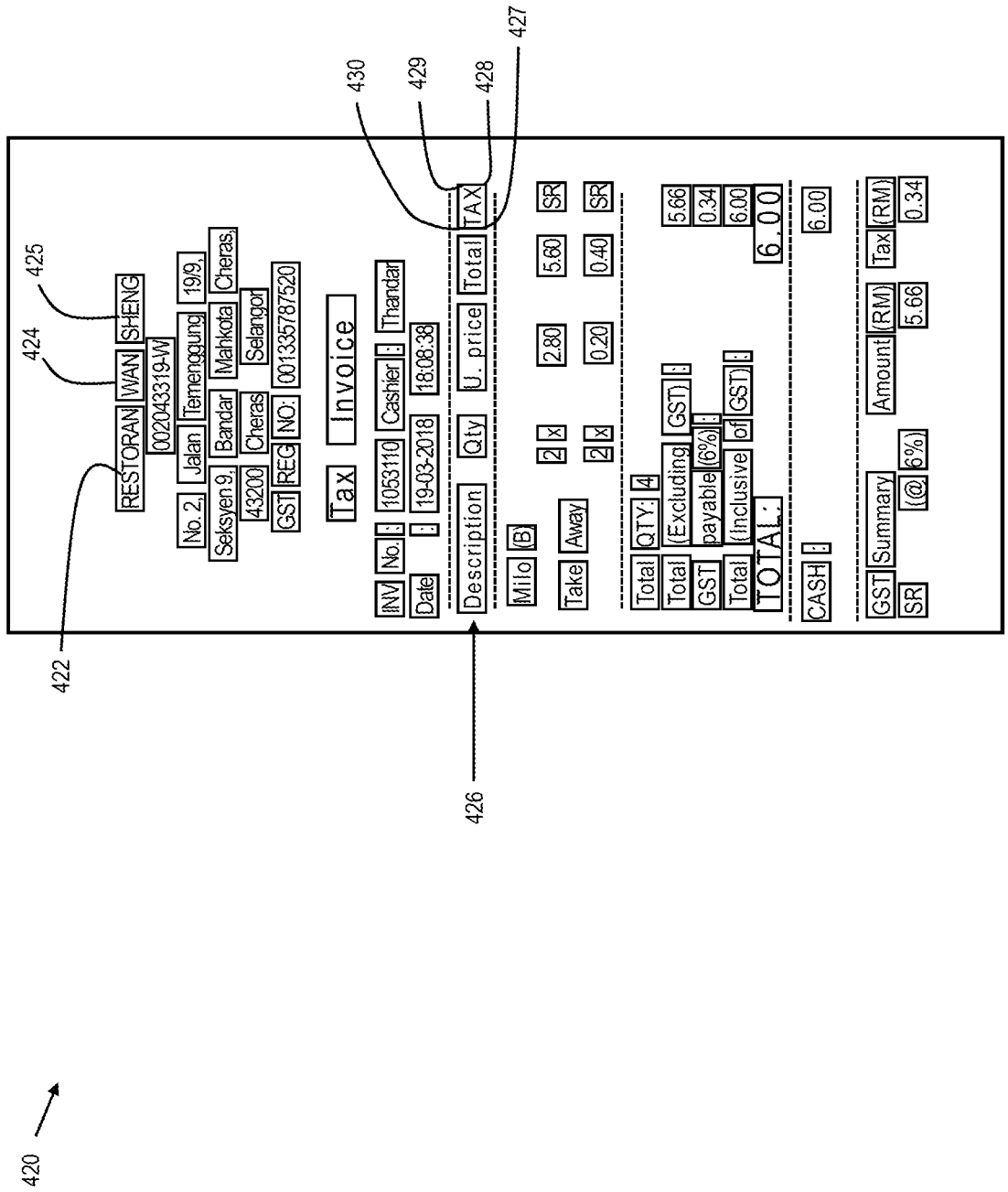
FIG. 4B depicts an example of a partially-processed input document image according to certain embodiments.

FIG. 4B depicts an example of a partially-processed input document image 420 according to certain embodiments. As described above, the OCR subsystem 110 performs the processing on the input document image 400 to distinguish the text units, e.g., the content items. For example, each text unit corresponds to a value. The OCR subsystem 110 may parse the text of the input document image 400 into the text units and generate a bounding box around each text unit, as depicted in FIG. 4B.

Continuing with the example of the content items arranged in the first row 402 of FIG. 4A, in the partially-processed input document image 420, the first content item 406 has a first bounding box 422, the second content item 408 has a second bounding box 424, and the third content item 410 has a third bounding box 425. Each of the first bounding box 422, the second bounding box 424, and the third bounding box 425 has four corners, where the coordinates of each corner of the first bounding box 422, the second bounding box 424, and the third bounding box 425 provide a location of that bounding box with respect to the input document image 400.

For example, a content item ("TAX") is included in an eleventh row 426 and is enclosed by a bounding box having a first corner 427, a second corner 428, a third corner 429, and a fourth corner 430. The x, y coordinates of the first corner 427, the second corner 428, the third corner 429, and the fourth corner 430 identify a location of the content item "TAX" with respect to the input document image 400. For example, a pixel coordinate system may be used.

Figure 4C:
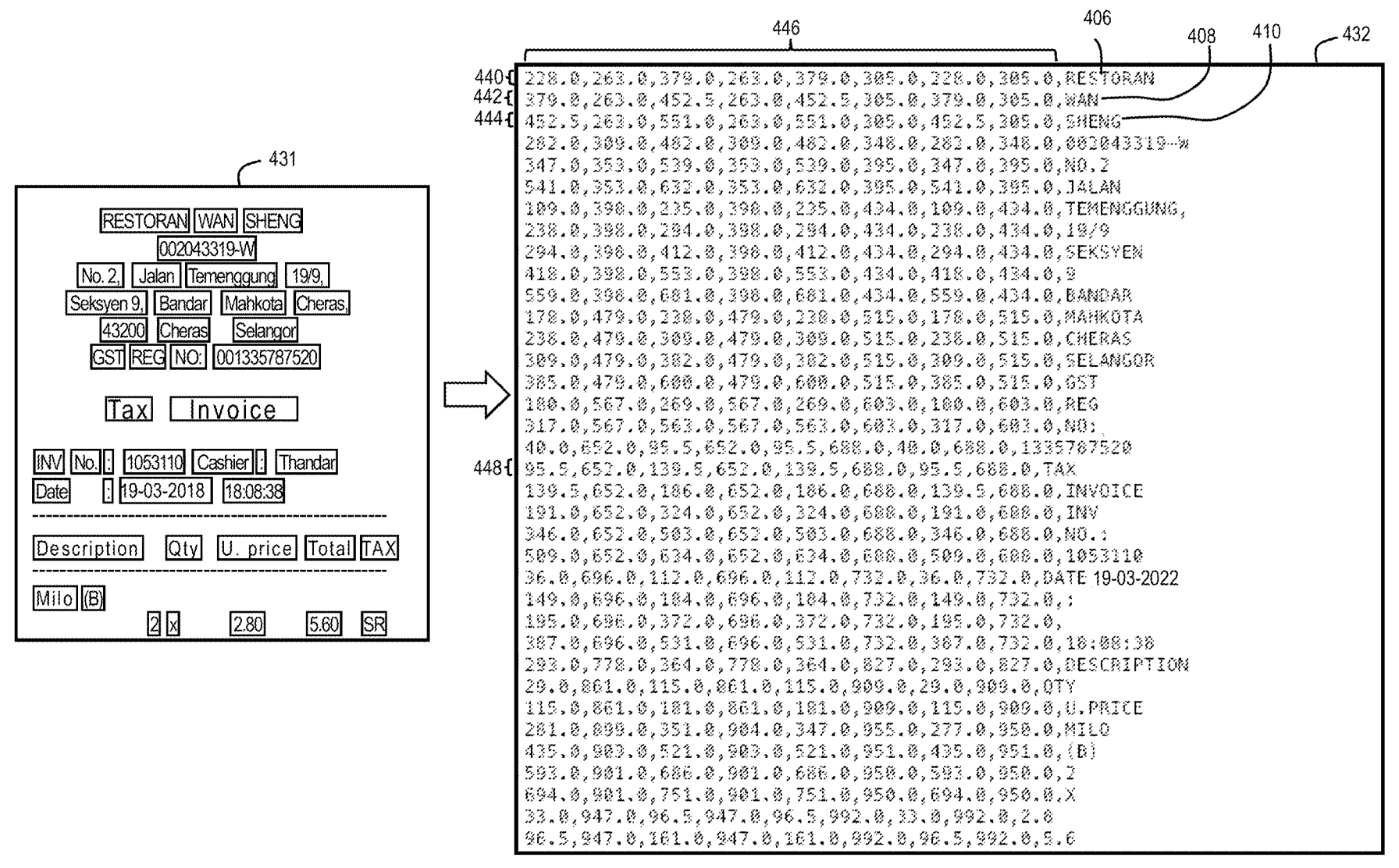

FIG. 4C depicts an example of an OCR image according to certain embodiments.

In detail, FIG. 4C depicts a portion 431 of the partially-processed input document image 420 of FIG. 4B and an OCR image 432 (e.g., an OCR result) corresponding to the portion 431. Although FIG. 4C depicts only the portion 431 of the partially-processed input document image 420 as being OCRed, such representation is made for illustrative purposes only. In embodiments, the partially-processed input document image 420 is processed in its entirety so that the OCR image 432 contains information corresponding to all of the rows of the input document image 400 of FIG. 4A. The information corresponding to the rows of the input document image 400 includes a corresponding content item and location information of that content item. The location information of the content items is extracted by the OCR subsystem 110 from the partially-processed input document image 420.

As described above, the OCR image 432 represents the input document image 400 and is obtained as a result of the processing performed by the OCR subsystem 110. Each row of the OCR image corresponds to one content item of the input document image 400, and includes the content item and information identifying, for the content item, a location of the content item within the input document image 400, e.g., the coordinates of four corners of the bounding box enclosing that content item.

Continuing with the above-described example of the content items included in the first row 402 of FIG. 4A, the first content item 406 ("RESTAURANT"), the second content item 408 ("WAN"), and the third content item 410 ("CHENG") are represented by three first rows in the OCR image 432. A first row 440 includes the first content item 406 ("RESTAURANT"), a second row 442 includes the second content item 408 ("WAN"), and a third row 444 includes the third content item 410 ("CHENG").

With reference again to FIG. 4B and continuing reference to FIG. 4C, each of the first row 440, the second row 442, and the third row 444 also includes x, y coordinates 446 of four corners of each bounding box 422, 424, and 425 respectively corresponding to the first content item 406 ("RESTAURANT"), the second content item 408 ("WAN"), and the third content item 410 ("CHENG").

As depicted in FIG. 4C, the content item ("TAX") is included in a nineteenth row 448 in the OCR image 432. The nineteenth row 448 of the OCR image 432 also includes x, y coordinates of the four corners of the bounding box enclosing the content item ("TAX"). The coordinates of the first corner 427 are 95.5, 652.0; the coordinates of the second corner 428 are 139.5, 652.0; the coordinates of the third corner 429 are 139.5, 688.0; and the coordinates of the fourth corner 430 are 95.5, 688.0. The x, y coordinates 446 of four corners of each bounding box enclosing the content item, as depicted in FIG. 4B, identify a location of that content item with respect to the input document image 400.

Figure 4D:
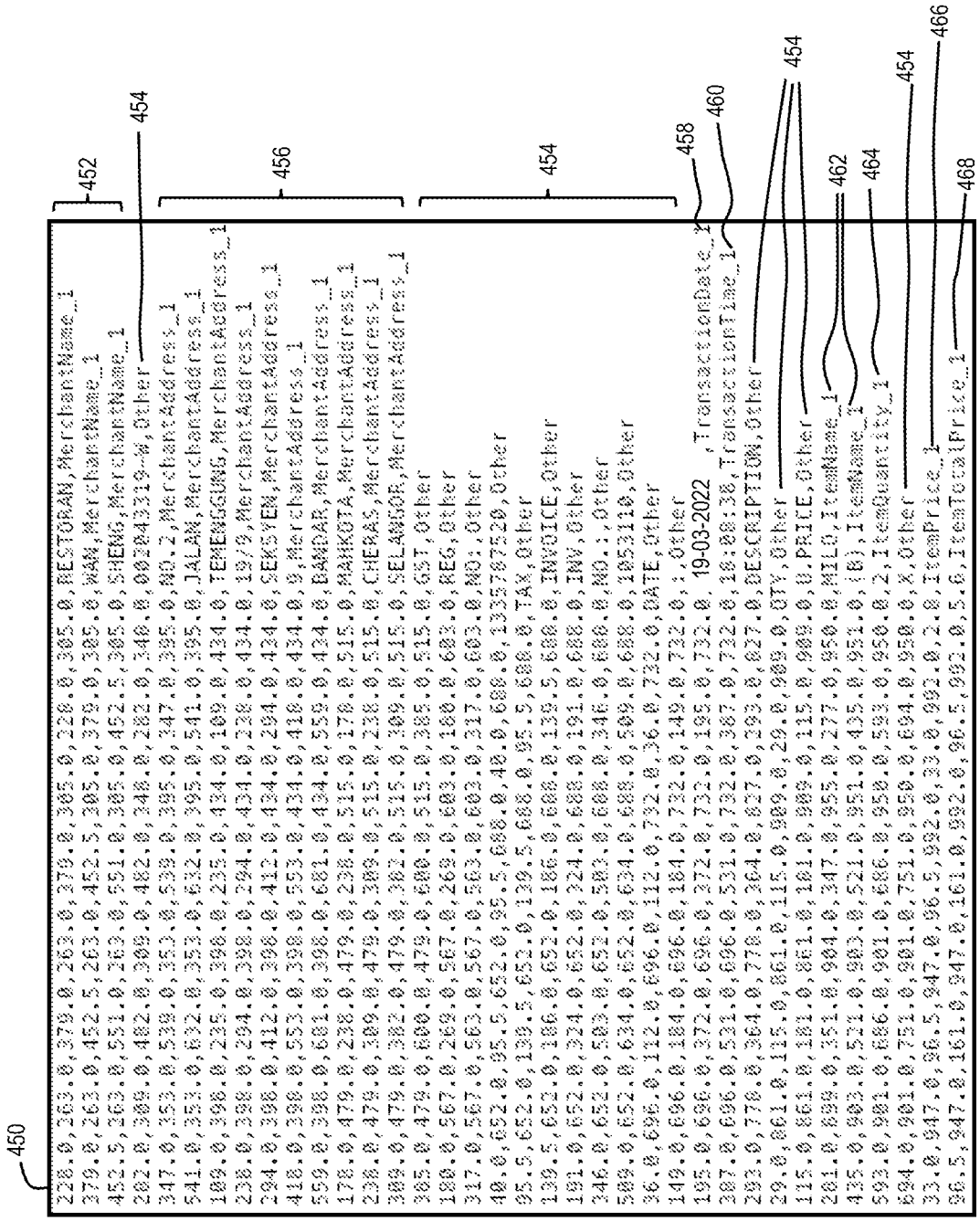
FIG. 4D depicts an example of an annotated OCR image according to certain embodiments.

FIG. 4D depicts an example of an annotated OCR image 450, e.g., annotated OCR result, according to certain embodiments.

In an embodiment, the annotations subsystem 114 is configured to receive the OCR image 432 from the OCR subsystem 110, and obtain the annotated OCR image 450. In certain implementations, the annotations subsystem 114 receives the annotations from the user device 120. The annotations categorize the content items, e.g., the annotations provide a key for some of the content items, where each of the keys is associated with a corresponding value.

With reference to FIGS. 4C and 4D, the first content item 406 ("RESTAURANT"), the second content item 408 ("WAN"), and the third content item 410 ("CHENG") are classified with a first key 452 ("MerchantName_1"). The first to third content items 406, 408, and 410 represent an example of a single key corresponding to multiple values that is represented by separate rows containing information pertaining to each value of the first to third content items 406, 408, and 410 so that a single key-single value pairs are formed each being identified by a key (e.g., a category), a value corresponding to the key, and corresponding location information.

The content item "002043319-W" is not a content item of interest and is not classified with a key, but is provided with a label 454 ("Other").

The content items underneath the content item "002043319-W" correspond to the street address and are classified by a second key 456 ("MerchantAddress_1"). A number of the content items, which are underneath the content items classified by the second key 456, are not the content items of interest and are provided with the label 454 ("Other").

A third key 458 ("TransactionDate_1") and a fourth key 460 ("TransactionTime_1") correspond to the content items identifying the date and the time of the purchase that are noted on the input document image 400.

A fifth key 462 ("ItemName_1") identifies a name of the item purchased.

A sixth key 464 ("ItemQuantity_1") identifies a quantity of the item purchased.

A seventh key 466 ("ItemPrice_1") identifies a price of the item purchased.

An eighth key 468 ("Item TotalPrice_1") identifies a total price of the items purchased.

However, the described-above is not intended to be limiting. In certain implementations, different annotations may be provided to the OCR image, e.g., a greater or a fewer number of the keys may be provided.

Figure 4E:
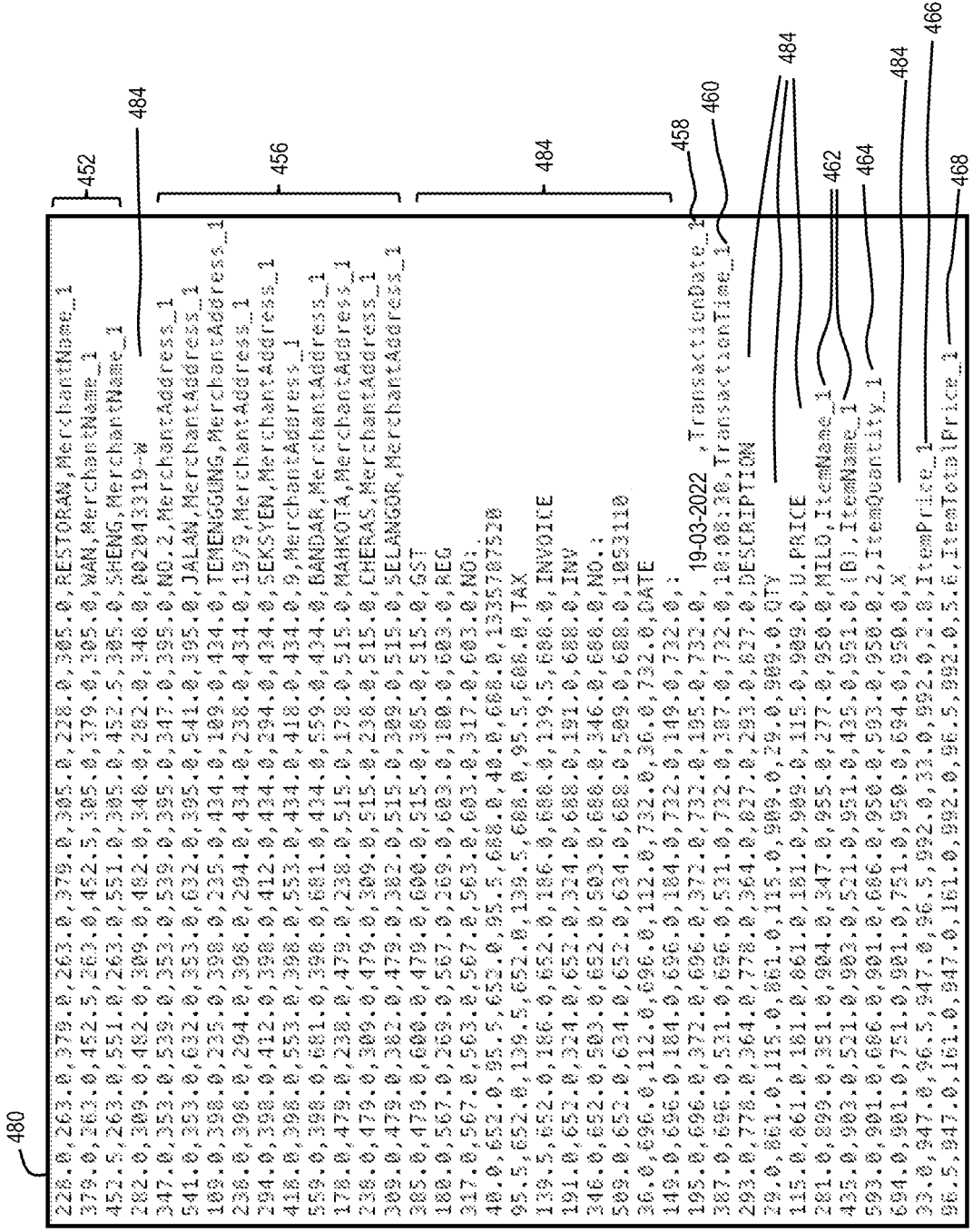
FIG. 4E depicts an example of an annotated OCR image according to certain embodiments.

FIG. 4E depicts an example of an annotated OCR image 480 according to certain embodiments.

As depicted in FIG. 4E, the first to eighth keys 452, 456, 458, 460, 462, 464, 466, and 468 are the same as in FIG. 4D. However, no specific label is provided for the content items that are of no interest (see reference number 484). In embodiments, based on a user input, e.g., through the user device 120, the label "Other" may be provided to the content items that are of no interest, no label may be provided to the content items that are of no interest, or the label "Other" may be provided to some of the content items that are of no interest and not provided to other content items that are of no interest.

As described above, although the exemplary input document image 400 includes many values (e.g., content items), only eight values are designated by the user to be changed, as provided by the annotations specifying the first to eighth keys 452, 456, 458, 460, 462, 464, 466, and 468 identifying the values on the input document image 400 that are specific to the user. According to the novel techniques described herein, equal amounts of diverse synthetic data may be obtained for each of the first to eighth keys 452, 456, 458, 460, 462, 464, 466, and 468. Further, by providing an input of narrower specific keys through the user device 120, the user may create customized training datasets, by specifying fewer values that are to be changed. For example, the user may provide the input of a fewer keys than the first to eighth keys 452, 456, 458, 460, 462, 464, 466, and 468.

Figure 5:
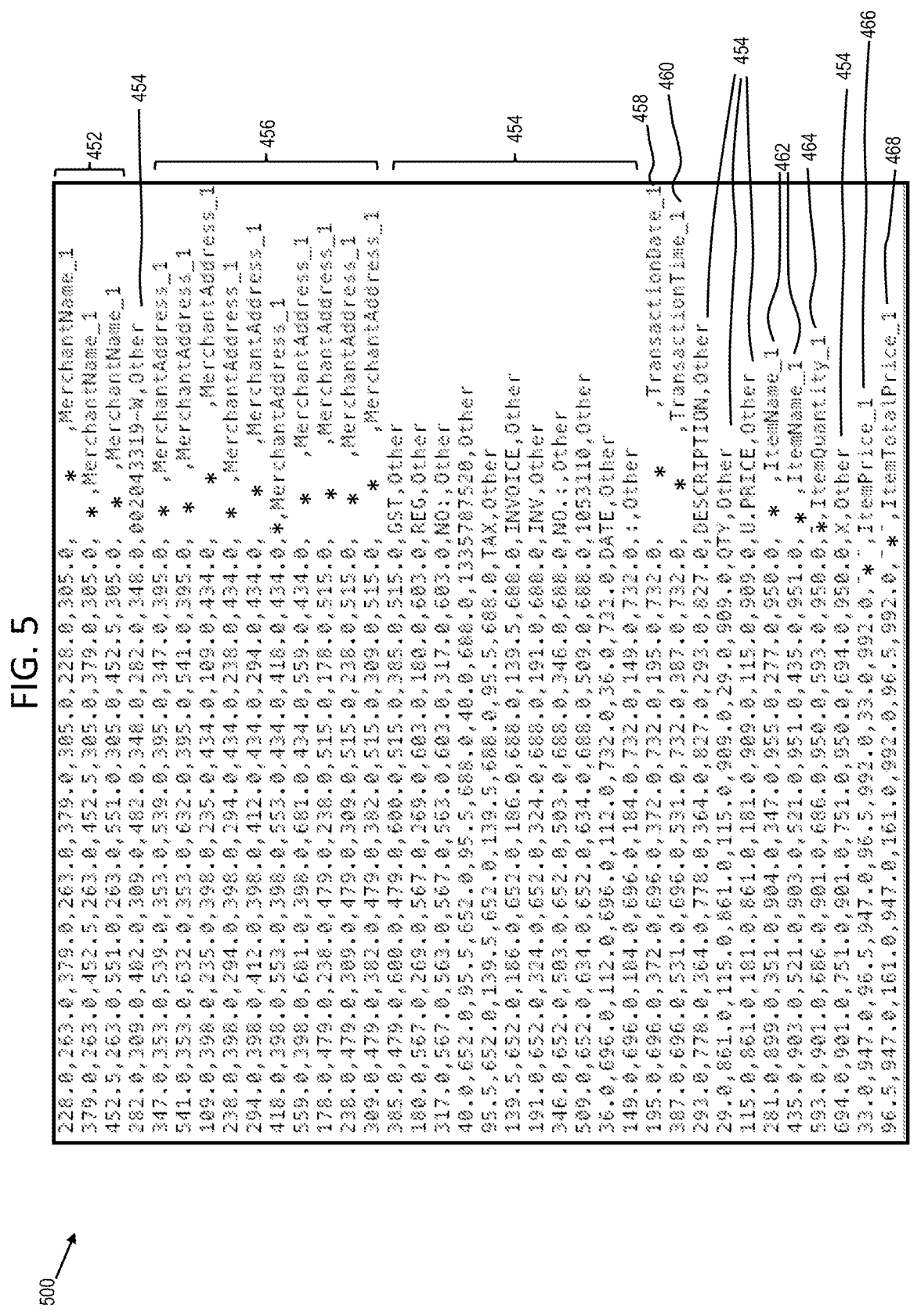

FIG. 5 depicts an example of a template 500 according to certain embodiments.

As described above, the template generation subsystem 116 is configured to receive the annotated OCR image, and generate the template 500.

The template 500 depicted in FIG. 5 is based on the annotated OCR image 450 of FIG. 4D, as a non-limiting example. In certain implementations, the template 500 may be based on the annotated OCR image 480 of FIG. 4E.

The template generation subsystem 116 removes or masks some of the values, e.g., the content items, from the annotated OCR image 450, where the empty value fields are generated to be filled with the synthetic data.

Accordingly, each row of the template 500 includes one of the first to the eighth keys 452, 456, 458, 460, 462, 464, 466, and 468, or the label 454 "Other." In those rows that include one of the first to the eighth keys 452, 456, 458, 460, 462, 464, 466, and 468, their corresponding values are removed (e.g., masked) and empty value fields are formed, as illustrated by an asterisk. Each row of the template 500 also includes x, y coordinates of a corresponding content item of the input document image 400 as described above.

Figure 6A:
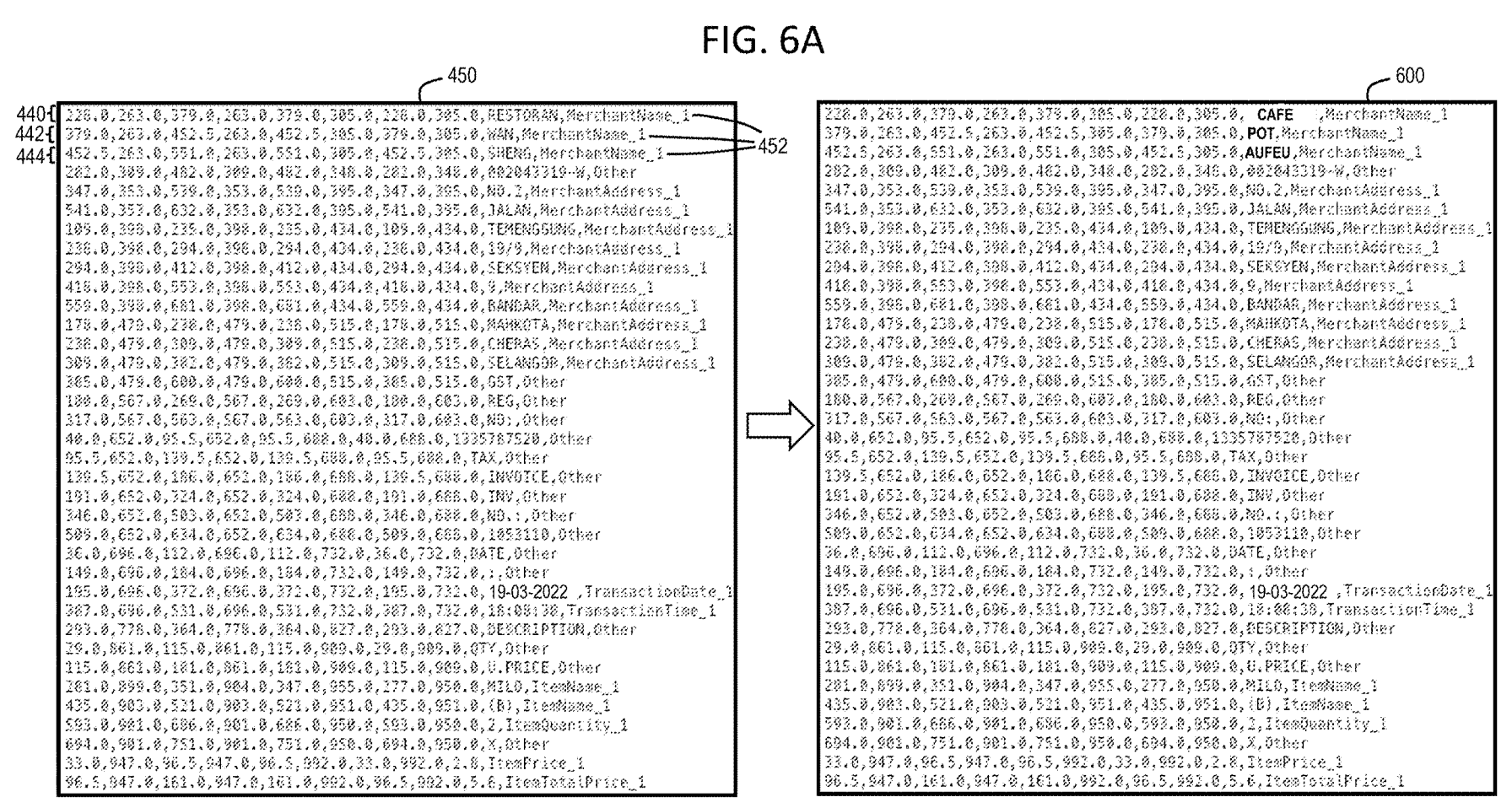
Figure 6B:
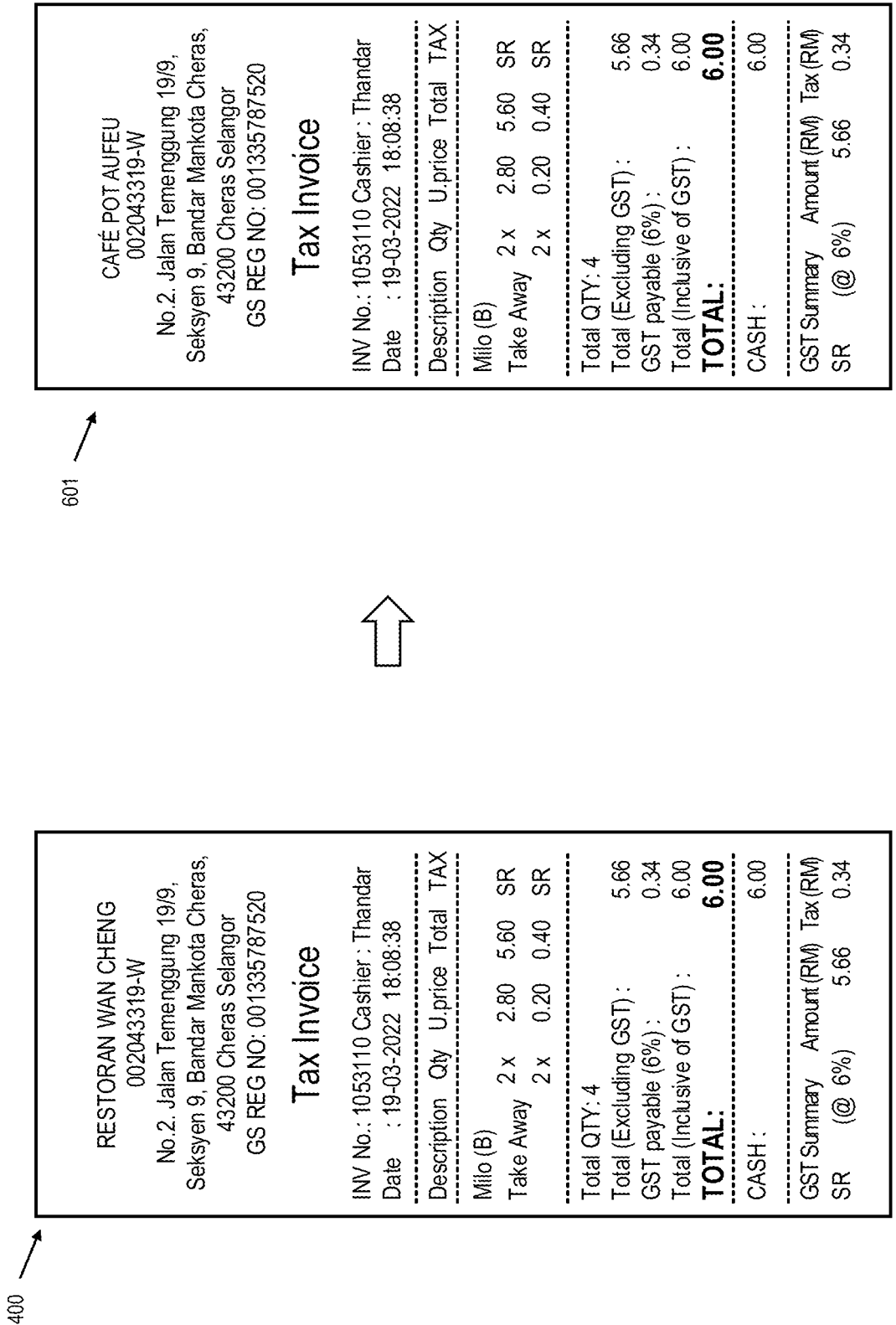
FIG. 6B depicts an example of a synthetic document image according to certain embodiments.

FIG. 6A depicts an example of a synthetic template 600 according to certain embodiments, and FIG. 6B depicts an example of a synthetic document image 601 according to certain embodiments.

Referring to FIGS. 1 and 6A, the synthetic value content substitutor 140 receives the template 500 from the template generation subsystem 116, and inserts at least one synthetic value into an empty value field of the template, where the empty value field of the template corresponds a particular key and to a value of a corresponding content item of the input document image 400.

In certain implementations, a user provides, through the user device 120, a selection of a particular key for value(s) of which the substitutions are to be made, so that each generated synthetic template contains variable value(s) for the same particular key or keys.

In an example, the user specifies "MerchantName_1" as the particular key for value(s) of which the substitutions are to be made. Based on the user input, the synthetic value content substitutor 140 is configured to perform an operation of variably substituting one or more values corresponding to a particular key, by inserting one or more synthetic values into one or more empty value fields of the template, where a plurality of synthetic templates may be generated, each having one or more varying synthetic values inserted into corresponding empty data fields of the template that correspond to one or more values.

As depicted in FIG. 6A, the first to third rows 440 to 444 of the annotated OCR image 450 include three values corresponding to the first key 452 ("MerchantName_1")—RESTAURANT, WAN, and CHENG.

Based on the user input, the synthetic value content substitutor 140 substitutes the values for the particular key, e.g., "MerchantName_1," with the synthetic values obtained from the KV content database 142. As depicted in the synthetic template 600 of FIG. 6A, the values of RESTAURANT, WAN, and CHENG are substituted with synthetic values CAFE, POT, and AUFEU that are obtained from the KV content database 142. However, this is not intended to be limiting. For example, if a user-specified particular key corresponds to only one historical value in the KV content database 142, only one of the values among RESTAURANT, WAN, and CHENG will be substituted with the synthetic value corresponding to the particular key, and the rest of the values will be masked. In this case, the annotations corresponding to the masked values will be removed.

Although the generation of one synthetic template is described above, in embodiments, a plurality of synthetic templates can be generated by variably changing one or more values corresponding to the particular key or keys specified by the user.

With references to FIG. 1 and FIG. 6B, the synthetic document image generator 143 may, based on the plurality of synthetic templates having variable value(s) corresponding to one particular key, respectively generate the first synthetic document image 144, and the second synthetic document image 146 to the Nth synthetic document image 148.

An example of a synthetic document image 601 generated based on one synthetic template is shown in FIG. 6B. As depicted in FIG. 6B, the synthetic document image 601 is generated based on the synthetic template 600 and has the same layout as the input document image 400. However, in the synthetic document image 601, the merchant name "CAFE POT AUFEU" is placed at the location of the merchant name "RESTAURANT WAN CHENG" present in the input document image 400.

Although the layout of the synthetic document image 601 adheres to the layout of the input document image 400, the stylistic change may be applied to the layout of the synthetic document image 601. As depicted in FIG. 6B, "CAFE POT AUFEU" is placed centered on the top of the synthetic document image 601. Also, based on the content items "POT" and "AUFEU," the deduction is made that the merchant's venue is French and, thus, a French accent mark is placed on "e" in "CAFE." Although not shown, another synthetic document image may be generated that does not have the French accent mark on "e" in "CAFE," to provide diversity. However, this is only an example, and a plurality of diverse synthetic document images are generated that are made different at least in one value for one key and further are made different in style, font, and/or background.

As described above, the merchant name "RESTAURANT WAN CHENG" includes three values or words, i.e., RESTAURANT, WAN, and CHENG that correspond to one key for one merchant. Equally, the merchant name "CAFE POT AUFEU" includes three synthetic values or words, i.e., CAFE, POT, and AUFEU that correspond to the same one key for another merchant. However, this is not intended to be limiting. For example, in the case that the synthetic value of the particular key, e.g., "MerchantName_1," that is obtained from the KV content database 142 has only one word corresponding to the key MerchantName_1 for one merchant, e.g., "LEMONGRASS," the synthetic document image generator 143 may adjust the style of the synthetic document image 601 so that "LEMONGRASS" is positioned centered on the top of the synthetic document image 601.

Figure 6D:
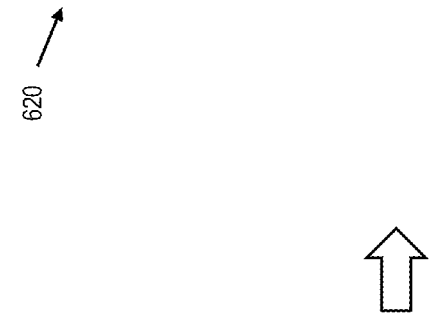
FIG. 6D depicts an example of a synthetic document image according to certain embodiments.

FIG. 6C depicts an example of a synthetic template 602 according to certain embodiments, and FIG. 6D depicts an example of a synthetic document image 620 according to certain embodiments.

With reference to FIGS. 1 and 6C, in certain implementations, a user provides, through the user device 120, a selection of a plurality of particular keys for value(s) of which the substitutions are to be made, so that each generated synthetic template contains variable value(s) for the same particular keys.

In an example, the user specifies the first key 452 "MerchantName_1" as a first particular key for value(s) of which the substitutions are to be made, and the third key 458 "TransactionDate_1" as a second particular key for value(s) of which the substitutions are to be made. Based on the user input, the synthetic value content substitutor 140 randomly substitutes the values corresponding to the first particular key and the second particular key in each synthetic template, by inserting the synthetic values into empty value fields of the template 500, where a plurality of synthetic templates may be generated, each having synthetic values inserted into corresponding fields of the template that correspond to the value(s) of the first particular key and the second particular key.

As exemplary depicted in FIG. 6C, an mth row 610 of the annotated OCR image 450 includes one value corresponding to the third key 458 ("TransactionDate_1")—"19-03-2022."

Based on the user input, the synthetic value content substitutor 140 substitutes the values for the first particular key, e.g., "MerchantName_1," with the synthetic values obtained from the KV content database 142. The substitution for the values corresponding to "MerchantName_1" is described above with reference to FIG. 6A.

As depicted in the synthetic template 602 of FIG. 6C, the value "19-03-2022" is substituted with synthetic value "19-01-2022" obtained from the KV content database 142.

Accordingly, in embodiments, a plurality of synthetic templates can be generated by variably changing one or more values corresponding to the first particular key and the second particular key that are specified by the user.

However, this is not intended to be limiting. A user can specify any number of particular keys among available keys to be randomly and variably changed in each of the synthetic templates.

With reference to FIG. 1 and FIG. 6D, the synthetic document image generator 143 may, based on the plurality of synthetic templates having variable values corresponding to a plurality of particular keys, respectively generate the first synthetic document image 144, and the second synthetic document image 146 to the Nth synthetic document image 148.

An example of a synthetic document image 620 generated based on one synthetic template in which the values of two particular keys are changed is shown in FIG. 6D. The synthetic document image 620 is generated based on the synthetic template 602. As depicted in FIG. 6D, the synthetic document image 620 has the same layout as the input document image 400. In the synthetic document image 620, the merchant name "CAFE POT AUFEU" is placed at the location of the merchant name "RESTAURANT WAN CHENG" present in the input document image 400. Further, in the synthetic document image 620, the date of purchase "19-01-2022" is placed at the location of the date of purchase "19-03-2022" present in the input document image 400.

Figure 7A:
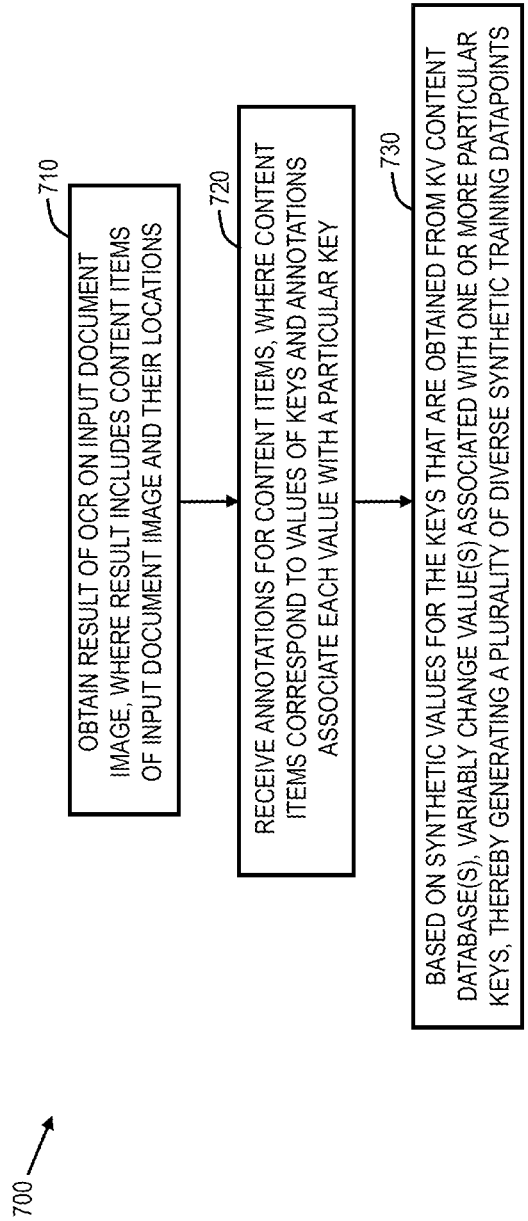
FIG. 7A depicts a simplified flowchart depicting processing performed by an SDGS according to certain embodiments.

FIG. 7A depicts a simplified flowchart depicting processing performed by the SDGS 100 according to certain embodiments. For example, the processing 700 depicted in FIG. 7A may be performed by some or all of the OCR subsystem 110, the annotations subsystem 114, the template generation subsystem 116, and the synthetic training datapoint generation subsystem 118.

The processing 700 depicted in FIG. 7A may be implemented in software (e.g., code, instructions, program) executed by one or more processing units (e.g., processors, cores) of the respective subsystems, using hardware, or combinations thereof. The software may be stored on a non-transitory storage medium (e.g., on a memory device). The method presented in FIG. 7A and described below is intended to be illustrative and non-limiting. Although FIG. 7A depicts the various processing operations occurring in a particular sequence or order, this is not intended to be limiting. In certain alternative embodiments, the processing 700 may be performed in some different order or some operations may be performed in parallel.

With continuing reference to FIG. 7A and referring again to FIG. 1, at 710, the OCR subsystem 110 obtains a result of performing the OCR on the input document image. The OCR result, e.g., the OCR image, includes content items included in the input document image and their corresponding locations.

At 720, the annotations subsystem 114 receives annotations for the content items. The content items correspond to values of the keys and the annotations associate each value with a particular key.

At 730, the synthetic training datapoint generation subsystem 118 variably changes value(s) associated with one or more particular keys based on synthetic values for the keys that are obtained based on historical KV pairs stored the KV content database(s) 142. As a result, the synthetic training datapoint generation subsystem 118 generates a plurality of diverse synthetic training datapoints.

Figure 7B:
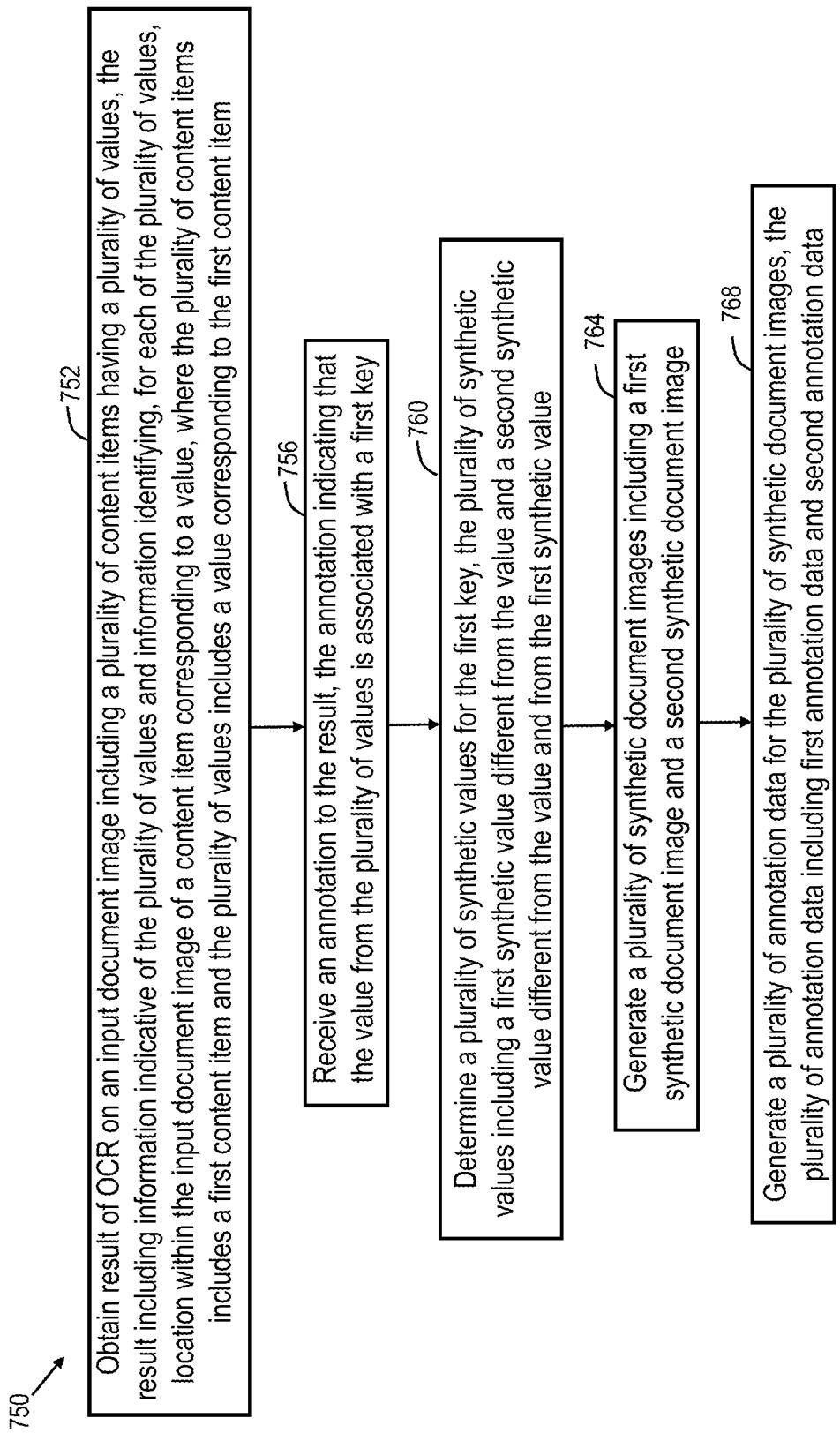
FIG. 7B depicts a simplified flowchart depicting processing performed by an SDGS according to certain embodiments.

FIG. 7B depicts a simplified flowchart depicting a processing 750 performed by the SDGS 100 according to certain embodiments. For example, the processing 750 depicted in FIG. 7B may be performed by some or all of the OCR subsystem 110, the annotations subsystem 114, the template generation subsystem 116, and the synthetic training datapoint generation subsystem 118.

The processing 750 depicted in FIG. 7B may be implemented in software (e.g., code, instructions, program) executed by one or more processing units (e.g., processors, cores) of the respective subsystems, using hardware, or combinations thereof. The software may be stored on a non-transitory storage medium (e.g., on a memory device). The method presented in FIG. 7B and described below is intended to be illustrative and non-limiting. Although FIG. 7B depicts the various processing operations occurring in a particular sequence or order, this is not intended to be limiting. In certain alternative embodiments, the processing 750 may be performed in some different order or some operations may be performed in parallel.

With continuing reference to FIG. 7B and referring again to FIG. 1, at 752, the OCR subsystem 110 obtains a result of performing OCR on an input document image including a plurality of content items having a plurality of values, respectively. The OCR result includes information indicative of the plurality of values and information identifying, for each of the plurality of values, a location within the input document image of a content item from the plurality of content items that corresponds to a value of the plurality of values. The plurality of content items includes a first content item and the plurality of values includes a value corresponding to the first content item.

At 756, the annotations subsystem 114 receives an annotation to the OCR result, the annotation indicating that the value from the plurality of values is associated with a first key.

At 760, the synthetic training datapoint generation subsystem 118 determines a plurality of synthetic values for the first key. The plurality of synthetic values includes a first synthetic value different from the value and a second synthetic value different from the value and from the first synthetic value.

At 764, the synthetic training datapoint generation subsystem 118 generates a plurality of synthetic document images including at least a first synthetic document image and a second synthetic document image. Operation 764 is described in more detail with reference to FIG. 7C.

At 768, the synthetic training datapoint generation subsystem 118 generates a plurality of annotation data for the plurality of synthetic document images. The plurality of annotation data includes at least first annotation data and second annotation data. Operation 768 is described in more detail with reference to FIG. 7D.

Figure 7C:
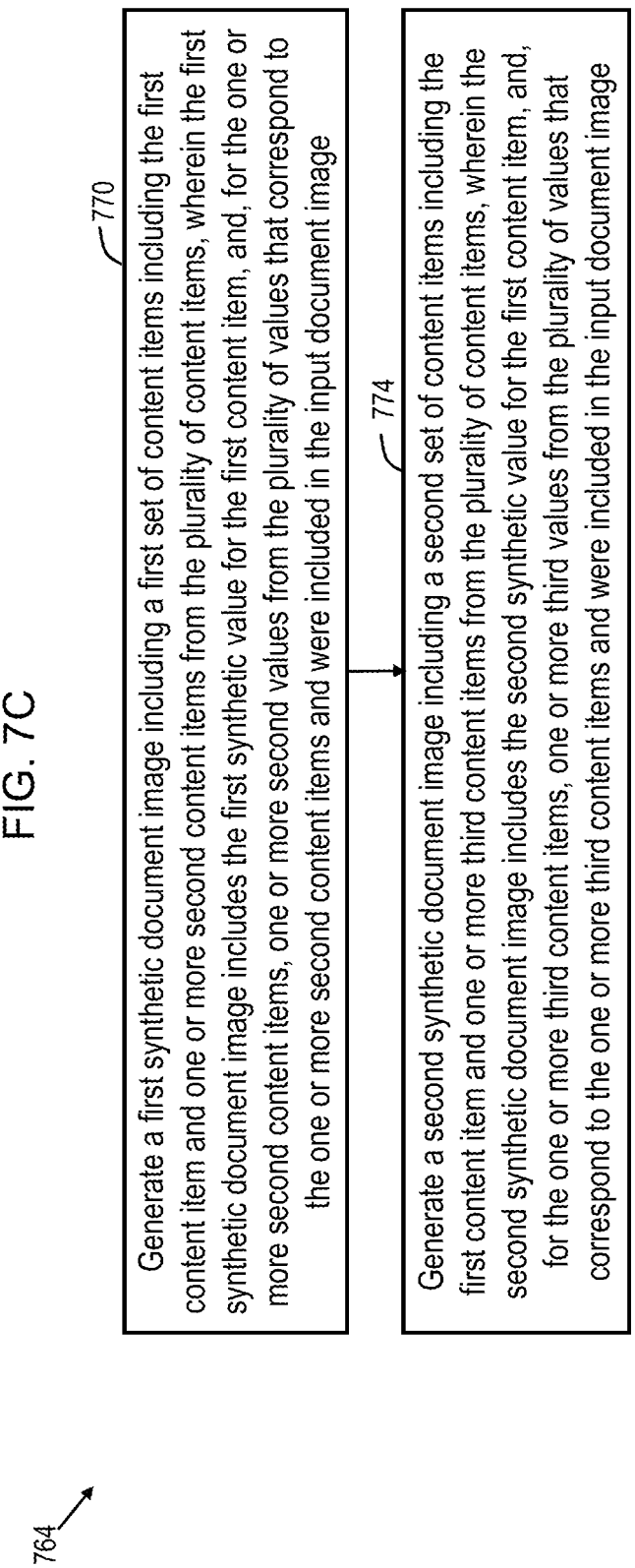
FIG. 7C depicts a simplified flowchart depicting a portion of processing performed by an SDGS according to certain embodiments.

FIG. 7C depicts a simplified flowchart depicting operation 764 of the processing 750 performed by the SDGS 100 according to certain embodiments.

At 770, the synthetic training datapoint generation subsystem 118 generates the first synthetic document image including a first set of content items including the first content item and one or more second content items from the plurality of content items. The first synthetic document image includes the first synthetic value for the first content item, and, for the one or more second content items, one or more second values from the plurality of values that correspond to the one or more second content items and were included in the input document image 400.

At 774, the synthetic training datapoint generation subsystem 118 generates the second synthetic document image including a second set of content items including the first content item and one or more third content items from the plurality of content items. The second synthetic document image includes the second synthetic value for the first content item, and, for the one or more third content items, one or more third values from the plurality of values that correspond to the one or more third content items and were included in the input document image 400. For example, the one or more second content items and the one or more third values may be the same or partially different.

Figure 7D:
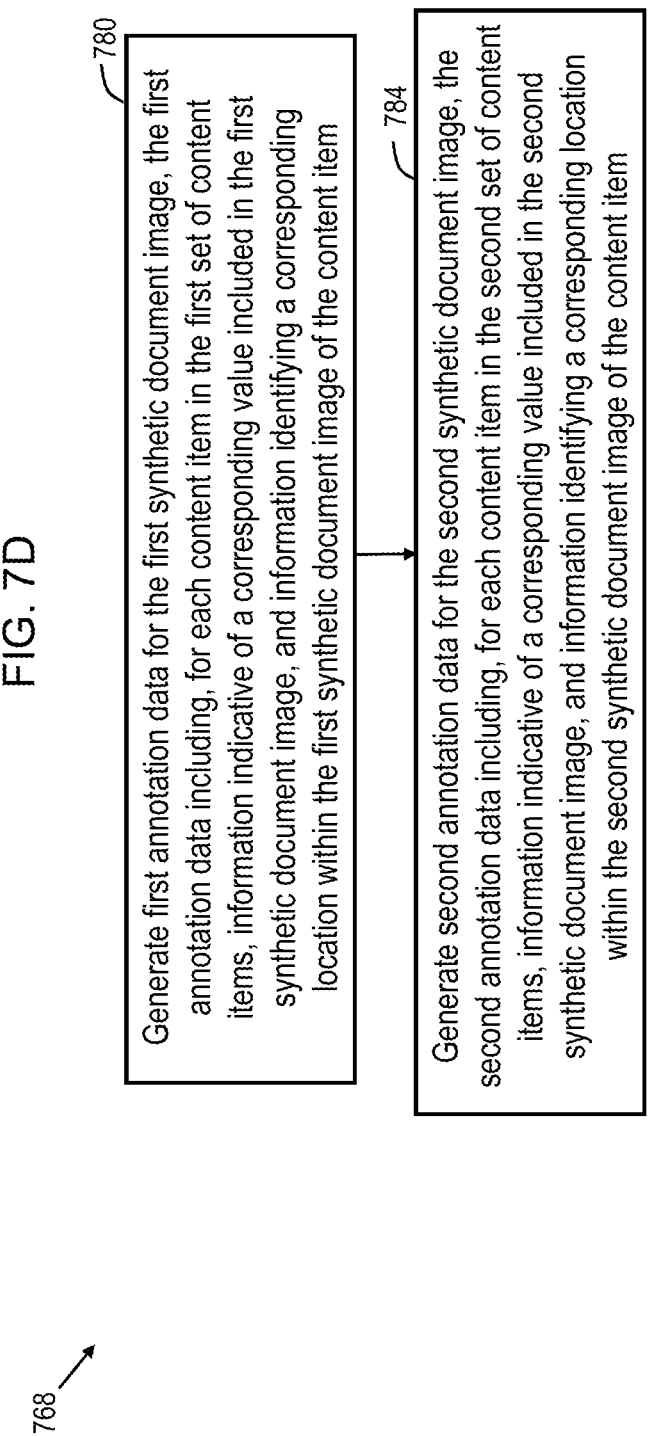
FIG. 7D depicts a simplified flowchart depicting a portion of processing performed by an SDGS according to certain embodiments.

FIG. 7D depicts a simplified flowchart depicting operation 768 of the processing 750 performed by the SDGS 100 according to certain embodiments.

At 780, the synthetic training datapoint generation subsystem 118 generates the first annotation data for the first synthetic document image. The first annotation data includes, for each content item in the first set of content items, information indicative of a corresponding value included in the first synthetic document image, and information identifying a corresponding location within the first synthetic document image of the content item.

At 784, the synthetic training datapoint generation subsystem 118 generates the second annotation data for the second synthetic document image. The second annotation data includes, for each content item in the second set of content items, information indicative of a corresponding value included in the second synthetic document image, and information identifying a corresponding location within the second synthetic document image of the content item.

Example Cloud Implementation

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 8:
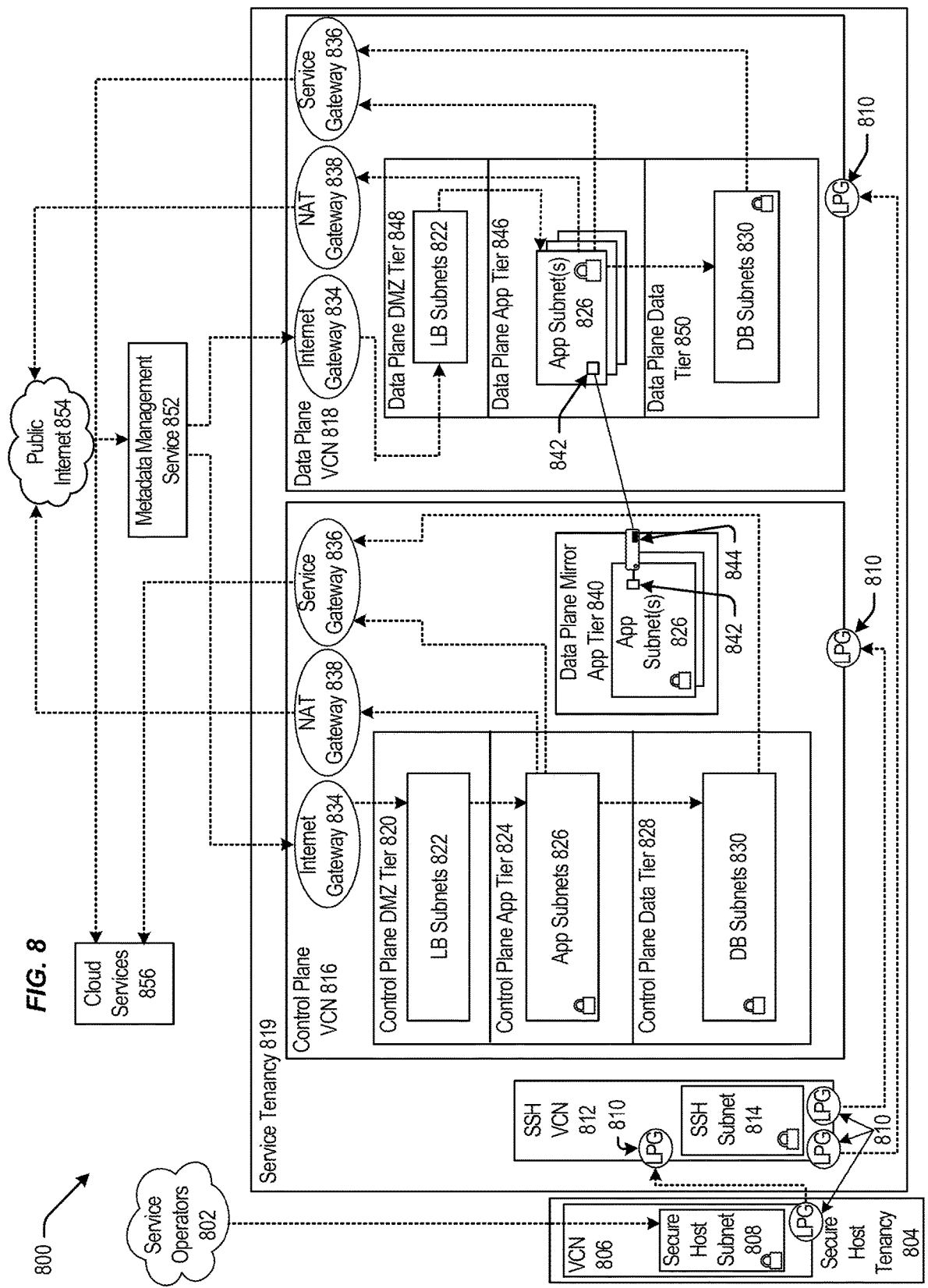
FIG. 8 is a block diagram illustrating one pattern for implementing a cloud infrastructure as a service system, according to at least one embodiment.

FIG. 8 is a block diagram 800 illustrating an example pattern of an IaaS architecture, according to at least one embodiment. Service operators 802 can be communicatively coupled to a secure host tenancy 804 that can include a virtual cloud network (VCN) 806 and a secure host subnet 808. In some examples, the service operators 802 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 806 and/or the Internet.

The VCN 806 can include a local peering gateway (LPG) 810 that can be communicatively coupled to a secure shell (SSH) VCN 812 via an LPG 810 contained in the SSH VCN 812. The SSH VCN 812 can include an SSH subnet 814, and the SSH VCN 812 can be communicatively coupled to a control plane VCN 816 via the LPG 810 contained in the control plane VCN 816. Also, the SSH VCN 812 can be communicatively coupled to a data plane VCN 818 via an LPG 810. The control plane VCN 816 and the data plane VCN 818 can be contained in a service tenancy 819 that can be owned and/or operated by the IaaS provider.

The control plane VCN 816 can include a control plane demilitarized zone (DMZ) tier 820 that acts as a perimeter network (e.g., portions of a corporate network between the corporate intranet and external networks). The DMZ-based servers may have restricted responsibilities and help keep breaches contained. Additionally, the DMZ tier 820 can include one or more load balancer (LB) subnet(s) 822, a control plane app tier 824 that can include app subnet(s) 826, a control plane data tier 828 that can include database (DB) subnet(s) 830 (e.g., frontend DB subnet(s) and/or backend DB subnet(s)). The LB subnet(s) 822 contained in the control plane DMZ tier 820 can be communicatively coupled to the app subnet(s) 826 contained in the control plane app tier 824 and an Internet gateway 834 that can be contained in the control plane VCN 816, and the app subnet(s) 826 can be communicatively coupled to the DB subnet(s) 830 contained in the control plane data tier 828 and a service gateway 836 and a network address translation (NAT) gateway 838. The control plane VCN 816 can include the service gateway 836 and the NAT gateway 838.

The control plane VCN 816 can include a data plane mirror app tier 840 that can include app subnet(s) 826. The app subnet(s) 826 contained in the data plane mirror app tier 840 can include a virtual network interface controller (VNIC) 842 that can execute a compute instance 844. The compute instance 844 can communicatively couple the app subnet(s) 826 of the data plane mirror app tier 840 to app subnet(s) 826 that can be contained in a data plane app tier 846.

The data plane VCN 818 can include the data plane app tier 846, a data plane DMZ tier 848, and a data plane data tier 850. The data plane DMZ tier 848 can include LB subnet(s) 822 that can be communicatively coupled to the app subnet(s) 826 of the data plane app tier 846 and the Internet gateway 834 of the data plane VCN 818. The app subnet(s) 826 can be communicatively coupled to the service gateway 836 of the data plane VCN 818 and the NAT gateway 838 of the data plane VCN 818. The data plane data tier 850 can also include the DB subnet(s) 830 that can be communicatively coupled to the app subnet(s) 826 of the data plane app tier 846.

The Internet gateway 834 of the control plane VCN 816 and of the data plane VCN 818 can be communicatively coupled to a metadata management service 852 that can be communicatively coupled to public Internet 854. Public Internet 854 can be communicatively coupled to the NAT gateway 838 of the control plane VCN 816 and of the data plane VCN 818. The service gateway 836 of the control plane VCN 816 and of the data plane VCN 818 can be communicatively couple to cloud services 856.

In some examples, the service gateway 836 of the control plane VCN 816 or of the data plane VCN 818 can make application programming interface (API) calls to cloud services 856 without going through public Internet 854. The API calls to cloud services 856 from the service gateway 836 can be one-way: the service gateway 836 can make API calls to cloud services 856, and cloud services 856 can send requested data to the service gateway 836. But, cloud services 856 may not initiate API calls to the service gateway 836.

In some examples, the secure host tenancy 804 can be directly connected to the service tenancy 819, which may be otherwise isolated. The secure host subnet 808 can communicate with the SSH subnet 814 through an LPG 810 that may enable two-way communication over an otherwise isolated system. Connecting the secure host subnet 808 to the SSH subnet 814 may give the secure host subnet 808 access to other entities within the service tenancy 819.

The control plane VCN 816 may allow users of the service tenancy 819 to set up or otherwise provision desired resources. Desired resources provisioned in the control plane VCN 816 may be deployed or otherwise used in the data plane VCN 818. In some examples, the control plane VCN 816 can be isolated from the data plane VCN 818, and the data plane mirror app tier 840 of the control plane VCN 816 can communicate with the data plane app tier 846 of the data plane VCN 818 via VNICs 842 that can be contained in the data plane mirror app tier 840 and the data plane app tier 846.

In some examples, users of the system, or customers, can make requests, for example create, read, update, or delete (CRUD) operations, through public Internet 854 that can communicate the requests to the metadata management service 852. The metadata management service 852 can communicate the request to the control plane VCN 816 through the Internet gateway 834. The request can be received by the LB subnet(s) 822 contained in the control plane DMZ tier 820. The LB subnet(s) 822 may determine that the request is valid, and in response to this determination, the LB subnet(s) 822 can transmit the request to app subnet(s) 826 contained in the control plane app tier 824. If the request is validated and requires a call to public Internet 854, the call to public Internet 854 may be transmitted to the NAT gateway 838 that can make the call to public Internet 854. Metadata that may be desired to be stored by the request can be stored in the DB subnet(s) 830.

In some examples, the data plane mirror app tier 840 can facilitate direct communication between the control plane VCN 816 and the data plane VCN 818. For example, changes, updates, or other suitable modifications to configuration may be desired to be applied to the resources contained in the data plane VCN 818. Via a VNIC 842, the control plane VCN 816 can directly communicate with, and can thereby execute the changes, updates, or other suitable modifications to configuration to, resources contained in the data plane VCN 818.

In some embodiments, the control plane VCN 816 and the data plane VCN 818 can be contained in the service tenancy 819. In this case, the user, or the customer, of the system may not own or operate either the control plane VCN 816 or the data plane VCN 818. Instead, the IaaS provider may own or operate the control plane VCN 816 and the data plane VCN 818, both of which may be contained in the service tenancy 819. This embodiment can enable isolation of networks that may prevent users or customers from interacting with other users', or other customers', resources. Also, this embodiment may allow users or customers of the system to store databases privately without needing to rely on public Internet 854, which may not have a desired level of threat prevention, for storage.

In other embodiments, the LB subnet(s) 822 contained in the control plane VCN 816 can be configured to receive a signal from the service gateway 836. In this embodiment, the control plane VCN 816 and the data plane VCN 818 may be configured to be called by a customer of the IaaS provider without calling public Internet 854. Customers of the IaaS provider may desire this embodiment since database(s) that the customers use may be controlled by the IaaS provider and may be stored on the service tenancy 819, which may be isolated from public Internet 854.

Figure 9:
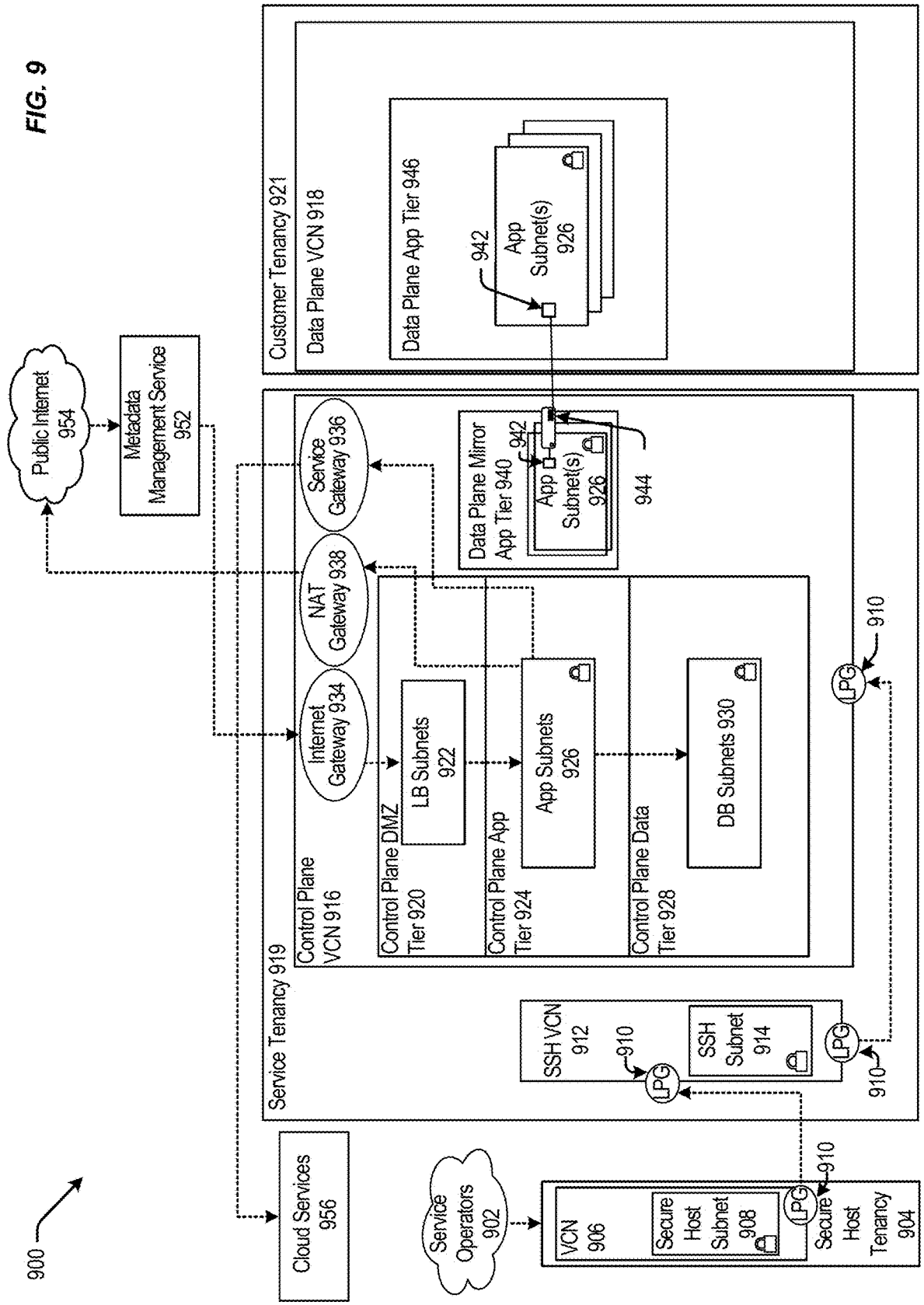
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g., service operators 802 of FIG. 8) can be communicatively coupled to a secure host tenancy 904 (e.g., the secure host tenancy 804 of FIG. 8) that can include a virtual cloud network (VCN) 906 (e.g., the VCN 806 of FIG. 8) and a secure host subnet 908 (e.g., the secure host subnet 808 of FIG. 8). The VCN 906 can include a local peering gateway (LPG) 910 (e.g., the LPG 810 of FIG. 8) that can be communicatively coupled to a secure shell (SSH) VCN 912 (e.g., the SSH VCN 812 of FIG. 8) via an LPG 810 contained in the SSH VCN 912. The SSH VCN 912 can include an SSH subnet 914 (e.g., the SSH subnet 814 of FIG. 8), and the SSH VCN 912 can be communicatively coupled to a control plane VCN 916 (e.g., the control plane VCN 816 of FIG. 8) via an LPG 910 contained in the control plane VCN 916. The control plane VCN 916 can be contained in a service tenancy 919 (e.g., the service tenancy 819 of FIG. 8), and the data plane VCN 918 (e.g., the data plane VCN 818 of FIG. 8) can be contained in a customer tenancy 921 that may be owned or operated by users, or customers, of the system.

The control plane VCN 916 can include a control plane DMZ tier 920 (e.g., the control plane DMZ tier 820 of FIG. 8) that can include LB subnet(s) 922 (e.g., LB subnet(s) 822 of FIG. 8), a control plane app tier 924 (e.g., the control plane app tier 824 of FIG. 8) that can include app subnet(s) 926 (e.g., app subnet(s) 826 of FIG. 8), a control plane data tier 928 (e.g., the control plane data tier 828 of FIG. 8) that can include database (DB) subnet(s) 930 (e.g., similar to DB subnet(s) 830 of FIG. 8). The LB subnet(s) 922 contained in the control plane DMZ tier 920 can be communicatively coupled to the app subnet(s) 926 contained in the control plane app tier 924 and an Internet gateway 934 (e.g., the Internet gateway 834 of FIG. 8) that can be contained in the control plane VCN 916, and the app subnet(s) 926 can be communicatively coupled to the DB subnet(s) 930 contained in the control plane data tier 928 and a service gateway 936 (e.g., the service gateway 836 of FIG. 8) and a network address translation (NAT) gateway 938 (e.g., the NAT gateway 838 of FIG. 8). The control plane VCN 916 can include the service gateway 936 and the NAT gateway 938.

The control plane VCN 916 can include a data plane mirror app tier 940 (e.g., the data plane mirror app tier 840 of FIG. 8) that can include app subnet(s) 926. The app subnet(s) 926 contained in the data plane mirror app tier 940 can include a virtual network interface controller (VNIC) 942 (e.g., the VNIC of 842) that can execute a compute instance 944 (e.g., similar to the compute instance 844 of FIG. 8). The compute instance 944 can facilitate communication between the app subnet(s) 926 of the data plane mirror app tier 940 and the app subnet(s) 926 that can be contained in a data plane app tier 946 (e.g., the data plane app tier 846 of FIG. 8) via the VNIC 942 contained in the data plane mirror app tier 940 and the VNIC 942 contained in the data plane app tier 946.

The Internet gateway 934 contained in the control plane VCN 916 can be communicatively coupled to a metadata management service 952 (e.g., the metadata management service 852 of FIG. 8) that can be communicatively coupled to public Internet 954 (e.g., public Internet 854 of FIG. 8). Public Internet 954 can be communicatively coupled to the NAT gateway 938 contained in the control plane VCN 916. The service gateway 936 contained in the control plane VCN 916 can be communicatively couple to cloud services 956 (e.g., cloud services 856 of FIG. 8).

In some examples, the data plane VCN 918 can be contained in the customer tenancy 921. In this case, the IaaS provider may provide the control plane VCN 916 for each customer, and the IaaS provider may, for each customer, set up a unique compute instance 944 that is contained in the service tenancy 919. Each compute instance 944 may allow communication between the control plane VCN 916, contained in the service tenancy 919, and the data plane VCN 918 that is contained in the customer tenancy 921. The compute instance 944 may allow resources, that are provisioned in the control plane VCN 916 that is contained in the service tenancy 919, to be deployed or otherwise used in the data plane VCN 918 that is contained in the customer tenancy 921.

In other examples, the customer of the IaaS provider may have databases that live in the customer tenancy 921. In this example, the control plane VCN 916 can include the data plane mirror app tier 940 that can include app subnet(s) 926. The data plane mirror app tier 940 can reside in the data plane VCN 918, but the data plane mirror app tier 940 may not live in the data plane VCN 918. That is, the data plane mirror app tier 940 may have access to the customer tenancy 921, but the data plane mirror app tier 940 may not exist in the data plane VCN 918 or be owned or operated by the customer of the IaaS provider. The data plane mirror app tier 940 may be configured to make calls to the data plane VCN 918 but may not be configured to make calls to any entity contained in the control plane VCN 916. The customer may desire to deploy or otherwise use resources in the data plane VCN 918 that are provisioned in the control plane VCN 916, and the data plane mirror app tier 940 can facilitate the desired deployment, or other usage of resources, of the customer.

In some embodiments, the customer of the IaaS provider can apply filters to the data plane VCN 918. In this embodiment, the customer can determine what the data plane VCN 918 can access, and the customer may restrict access to public Internet 954 from the data plane VCN 918. The IaaS provider may not be able to apply filters or otherwise control access of the data plane VCN 918 to any outside networks or databases. Applying filters and controls by the customer onto the data plane VCN 918, contained in the customer tenancy 921, can help isolate the data plane VCN 918 from other customers and from public Internet 954.

In some embodiments, cloud services 956 can be called by the service gateway 936 to access services that may not exist on public Internet 954, on the control plane VCN 916, or on the data plane VCN 918. The connection between cloud services 956 and the control plane VCN 916 or the data plane VCN 918 may not be live or continuous. Cloud services 956 may exist on a different network owned or operated by the IaaS provider. Cloud services 956 may be configured to receive calls from the service gateway 936 and may be configured to not receive calls from public Internet 954. Some cloud services 956 may be isolated from other cloud services 956, and the control plane VCN 916 may be isolated from cloud services 956 that may not be in the same region as the control plane VCN 916. For example, the control plane VCN 916 may be located in "Region 1," and cloud service "Deployment 8," may be located in Region 1 and in "Region 2." If a call to Deployment 8 is made by the service gateway 936 contained in the control plane VCN 916 located in Region 1, the call may be transmitted to Deployment 8 in Region 1. In this example, the control plane VCN 916, or Deployment 8 in Region 1, may not be communicatively coupled to, or otherwise in communication with, Deployment 8 in Region 2.

Figure 10:
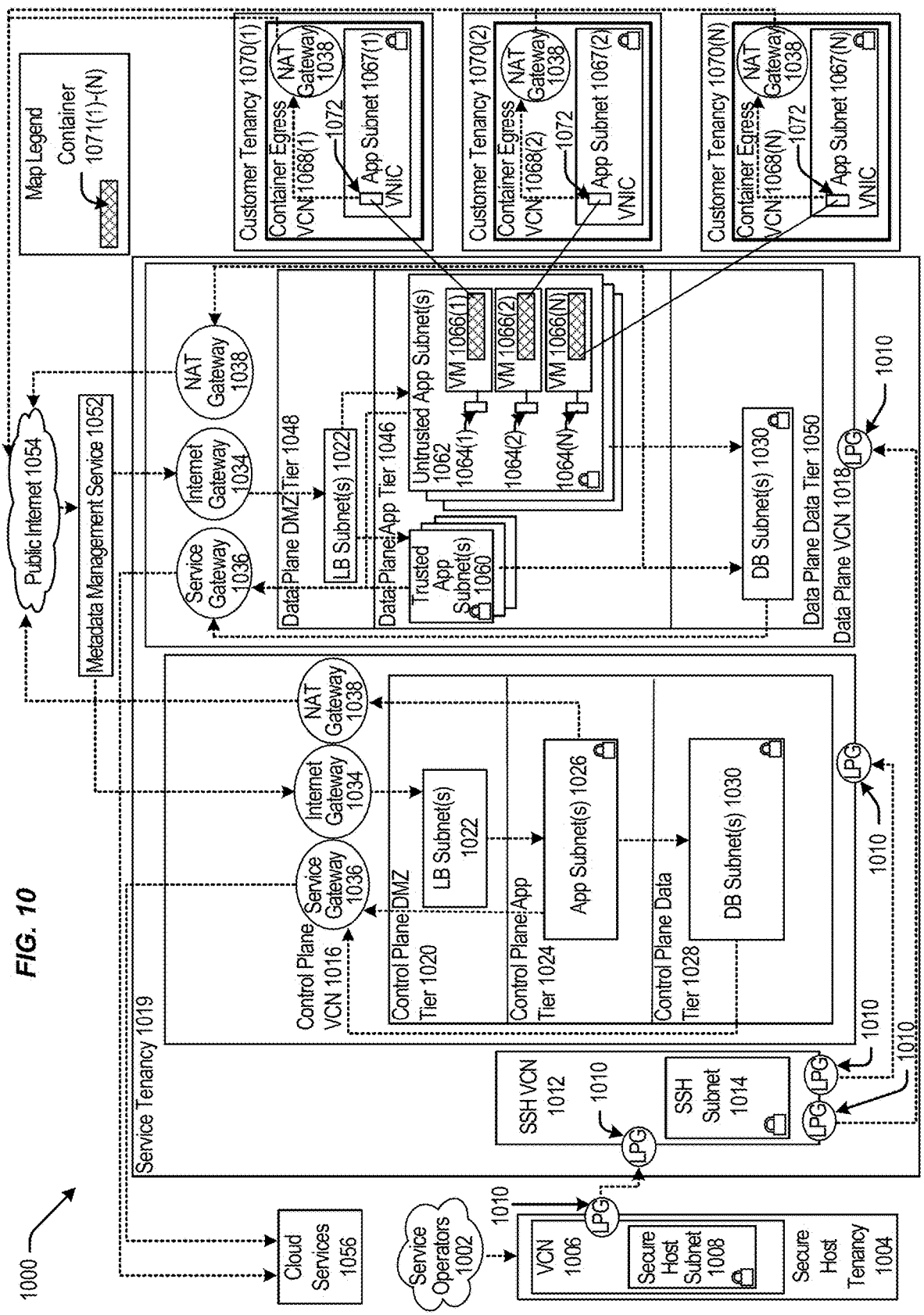
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g., service operators 802 of FIG. 8) can be communicatively coupled to a secure host tenancy 1004 (e.g., the secure host tenancy 804 of FIG. 8) that can include a virtual cloud network (VCN) 1006 (e.g., the VCN 806 of FIG. 8) and a secure host subnet 1008 (e.g., the secure host subnet 808 of FIG. 8). The VCN 1006 can include an LPG 1010 (e.g., the LPG 810 of FIG. 8) that can be communicatively coupled to an SSH VCN 1012 (e.g., the SSH VCN 812 of FIG. 8) via an LPG 1010 contained in the SSH VCN 1012. The SSH VCN 1012 can include an SSH subnet 1014 (e.g., the SSH subnet 814 of FIG. 8), and the SSH VCN 1012 can be communicatively coupled to a control plane VCN 1016 (e.g., the control plane VCN 816 of FIG. 8) via an LPG 1010 contained in the control plane VCN 1016 and to a data plane VCN 1018 (e.g., the data plane 818 of FIG. 8) via an LPG 1010 contained in the data plane VCN 1018. The control plane VCN 1016 and the data plane VCN 1018 can be contained in a service tenancy 1019 (e.g., the service tenancy 819 of FIG. 8).

The control plane VCN 1016 can include a control plane DMZ tier 1020 (e.g., the control plane DMZ tier 820 of FIG.

8) that can include load balancer (LB) subnet(s) 1022 (e.g., LB subnet(s) 822 of FIG. 8), a control plane app tier 1024 (e.g., the control plane app tier 824 of FIG. 8) that can include app subnet(s) 1026 (e.g., similar to app subnet(s) 826 of FIG. 8), a control plane data tier 1028 (e.g., the control plane data tier 828 of FIG. 8) that can include DB subnet(s) 1030. The LB subnet(s) 1022 contained in the control plane DMZ tier 1020 can be communicatively coupled to the app subnet(s) 1026 contained in the control plane app tier 1024 and to an Internet gateway 1034 (e.g., the Internet gateway 834 of FIG. 8) that can be contained in the control plane VCN 1016, and the app subnet(s) 1026 can be communicatively coupled to the DB subnet(s) 1030 contained in the control plane data tier 1028 and to a service gateway 1036 (e.g., the service gateway of FIG. 8) and a network address translation (NAT) gateway 1038 (e.g., the NAT gateway 838 of FIG. 8). The control plane VCN 1016 can include the service gateway 1036 and the NAT gateway 1038.

The data plane VCN 1018 can include a data plane app tier 1046 (e.g., the data plane app tier 846 of FIG. 8), a data plane DMZ tier 1048 (e.g., the data plane DMZ tier 848 of FIG. 8), and a data plane data tier 1050 (e.g., the data plane data tier 850 of FIG. 8). The data plane DMZ tier 1048 can include LB subnet(s) 1022 that can be communicatively coupled to trusted app subnet(s) 1060 and untrusted app subnet(s) 1062 of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include one or more primary VNICs 1064(1)-(N) that can be communicatively coupled to tenant virtual machines (VMs) 1066(1)-(N). Each tenant VM 1066(1)-(N) can be communicatively coupled to a respective app subnet 1067(1)-(N) that can be contained in respective container egress VCNs 1068(1)-(N) that can be contained in respective customer tenancies 1070(1)-(N). Respective secondary VNICs 1072(1)-(N) can facilitate communication between the untrusted app subnet(s) 1062 contained in the data plane VCN 1018 and the app subnet contained in the container egress VCNs 1068(1)-(N). Each container egress VCNs 1068(1)-(N) can include a NAT gateway 1038 that can be communicatively coupled to public Internet 1054 (e.g., public Internet 854 of FIG. 8).

The Internet gateway 1034 contained in the control plane VCN 1016 and contained in the data plane VCN 1018 can be communicatively coupled to a metadata management service 1052 (e.g., the metadata management service 852 of FIG. 8) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some embodiments, the data plane VCN 1018 can be integrated with customer tenancies 1070. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1046. Code to run the function may be executed in the VMs 1066(1)-(N), and the code may not be configured to run anywhere else on the data plane VCN 1018. Each VM 1066(1)-(N) may be connected to one customer tenancy 1070. Respective containers 1071(1)-(N) contained in the VMs 1066(1)-(N) may be configured to run the code. In this case, there can be a dual isolation (e.g., the containers 1071(1)-(N) running code, where the containers 1071(1)-(N) may be contained in at least the VM 1066(1)-(N) that are contained in the untrusted app subnet(s) 1062), which may help prevent incorrect or otherwise undesirable code from damaging the network of the IaaS provider or from damaging a network of a different customer. The containers 1071(1)-(N) may be communicatively coupled to the customer tenancy 1070 and may be configured to transmit or receive data from the customer tenancy 1070. The containers 1071(1)-(N) may not be configured to transmit or receive data from any other entity in the data plane VCN 1018. Upon completion of running the code, the IaaS provider may kill or otherwise dispose of the containers 1071(1)-(N).

In some embodiments, the trusted app subnet(s) 1060 may run code that may be owned or operated by the IaaS provider. In this embodiment, the trusted app subnet(s) 1060 may be communicatively coupled to the DB subnet(s) 1030 and be configured to execute CRUD operations in the DB subnet(s) 1030. The untrusted app subnet(s) 1062 may be communicatively coupled to the DB subnet(s) 1030, but in this embodiment, the untrusted app subnet(s) may be configured to execute read operations in the DB subnet(s) 1030. The containers 1071(1)-(N) that can be contained in the VM 1066(1)-(N) of each customer and that may run code from the customer may not be communicatively coupled with the DB subnet(s) 1030.

In other embodiments, the control plane VCN 1016 and the data plane VCN 1018 may not be directly communicatively coupled. In this embodiment, there may be no direct communication between the control plane VCN 1016 and the data plane VCN 1018. However, communication can occur indirectly through at least one method. An LPG 1010 may be established by the IaaS provider that can facilitate communication between the control plane VCN 1016 and the data plane VCN 1018. In another example, the control plane VCN 1016 or the data plane VCN 1018 can make a call to cloud services 1056 via the service gateway 1036. For example, a call to cloud services 1056 from the control plane VCN 1016 can include a request for a service that can communicate with the data plane VCN 1018.

Figure 11:
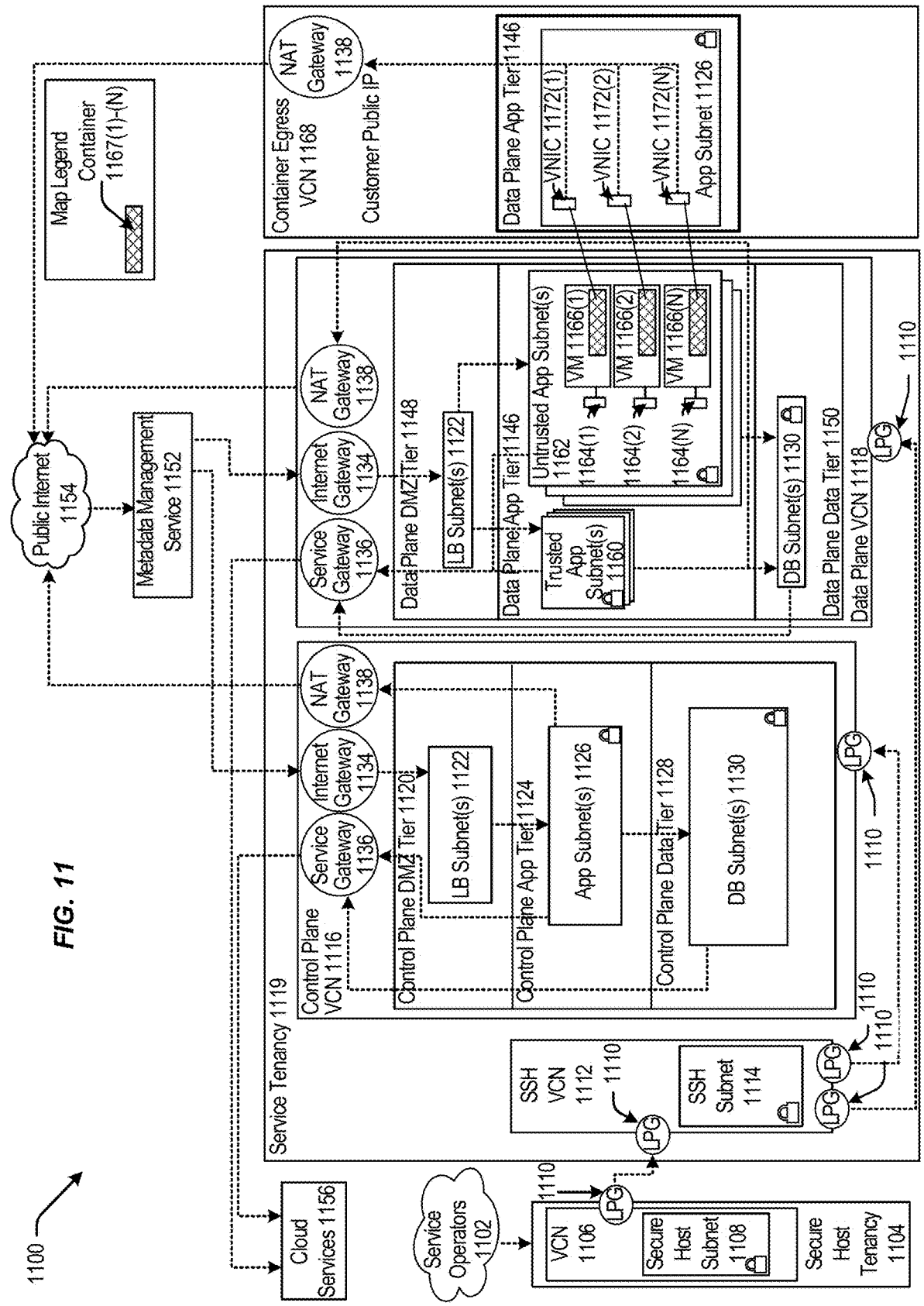
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g., service operators 802 of FIG. 8) can be communicatively coupled to a secure host tenancy 1104 (e.g., the secure host tenancy 804 of FIG. 8) that can include a virtual cloud network (VCN) 1106 (e.g., the VCN 806 of FIG. 8) and a secure host subnet 1108 (e.g., the secure host subnet 808 of FIG. 8). The VCN 1106 can include an LPG 1110 (e.g., the LPG 810 of FIG. 8) that can be communicatively coupled to an SSH VCN 1112 (e.g., the SSH VCN 812 of FIG. 8) via an LPG 1110 contained in the SSH VCN 1112. The SSH VCN 1112 can include an SSH subnet 1114 (e.g., the SSH subnet 814 of FIG. 8), and the SSH VCN 1112 can be communicatively coupled to a control plane VCN 1116 (e.g., the control plane VCN 816 of FIG. 8) via an LPG 1110 contained in the control plane VCN 1116 and to a data plane VCN 1118 (e.g., the data plane 818 of FIG. 8) via an LPG 1110 contained in the data plane VCN 1118. The control plane VCN 1116 and the data plane VCN 1118 can be contained in a service tenancy 1119 (e.g., the service tenancy 819 of FIG. 8).

The control plane VCN 1116 can include a control plane DMZ tier 1120 (e.g., the control plane DMZ tier 820 of FIG. 8) that can include LB subnet(s) 1122 (e.g., LB subnet(s) 822 of FIG. 8), a control plane app tier 1124 (e.g., the control plane app tier 824 of FIG. 8) that can include app subnet(s) 1126 (e.g., app subnet(s) 826 of FIG. 8), a control plane data tier 1128 (e.g., the control plane data tier 828 of FIG. 8) that can include DB subnet(s) 1130 (e.g., DB subnet(s) 1030 of FIG. 10). The LB subnet(s) 1122 contained in the control plane DMZ tier 1120 can be communicatively coupled to the app subnet(s) 1126 contained in the control plane app tier 1124 and to an Internet gateway 1134 (e.g., the Internet gateway 834 of FIG. 8) that can be contained in the control plane VCN 1116, and the app subnet(s) 1126 can be communicatively coupled to the DB subnet(s) 1130 contained in the control plane data tier 1128 and to a service gateway 1136 (e.g., the service gateway of FIG. 8) and a network address translation (NAT) gateway 1138 (e.g., the NAT gateway 838 of FIG. 8). The control plane VCN 1116 can include the service gateway 1136 and the NAT gateway 1138.

The data plane VCN 1118 can include a data plane app tier 1146 (e.g., the data plane app tier 846 of FIG. 8), a data plane DMZ tier 1148 (e.g., the data plane DMZ tier 848 of FIG. 8), and a data plane data tier 1150 (e.g., the data plane data tier 850 of FIG. 8). The data plane DMZ tier 1148 can include LB subnet(s) 1122 that can be communicatively coupled to trusted app subnet(s) 1160 (e.g., trusted app subnet(s) 1060 of FIG. 10) and untrusted app subnet(s) 1162 (e.g., untrusted app subnet(s) 1062 of FIG. 10) of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include primary VNICs 1164(1)-(N) that can be communicatively coupled to tenant virtual machines (VMs) 1166(1)-(N) residing within the untrusted app subnet(s) 1162. Each tenant VM 1166(1)-(N) can run code in a respective container 1167(1)-(N), and be communicatively coupled to an app subnet 1126 that can be contained in a data plane app tier 1146 that can be contained in a container egress VCN 1168. Respective secondary VNICs 1172(1)-(N) can facilitate communication between the untrusted app subnet(s) 1162 contained in the data plane VCN 1118 and the app subnet contained in the container egress VCN 1168. The container egress VCN can include a NAT gateway 1138 that can be communicatively coupled to public Internet 1154 (e.g., public Internet 854 of FIG. 8).

The Internet gateway 1134 contained in the control plane VCN 1116 and contained in the data plane VCN 1118 can be communicatively coupled to a metadata management service 1152 (e.g., the metadata management service 852 of FIG. 8) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some examples, the pattern illustrated by the architecture of block diagram 1100 of FIG. 11 may be considered an exception to the pattern illustrated by the architecture of block diagram 1000 of FIG. 10 and may be desirable for a customer of the IaaS provider if the IaaS provider cannot directly communicate with the customer (e.g., a disconnected region). The respective containers 1167(1)-(N) that are contained in the VMs 1166(1)-(N) for each customer can be accessed in real-time by the customer. The containers 1167(1)-(N) may be configured to make calls to respective secondary VNICs 1172(1)-(N) contained in app subnet(s) 1126 of the data plane app tier 1146 that can be contained in the container egress VCN 1168. The secondary VNICs 1172(1)-(N) can transmit the calls to the NAT gateway 1138 that may transmit the calls to public Internet 1154. In this example, the containers 1167(1)-(N) that can be accessed in real-time by the customer can be isolated from the control plane VCN 1116 and can be isolated from other entities contained in the data plane VCN 1118. The containers 1167(1)-(N) may also be isolated from resources from other customers.

In other examples, the customer can use the containers 1167(1)-(N) to call cloud services 1156. In this example, the customer may run code in the containers 1167(1)-(N) that requests a service from cloud services 1156. The containers 1167(1)-(N) can transmit this request to the secondary VNICs 1172(1)-(N) that can transmit the request to the NAT gateway that can transmit the request to public Internet 1154. Public Internet 1154 can transmit the request to LB subnet(s) 1122 contained in the control plane VCN 1116 via the Internet gateway 1134. In response to determining the request is valid, the LB subnet(s) can transmit the request to app subnet(s) 1126 that can transmit the request to cloud services 1156 via the service gateway 1136.

It should be appreciated that IaaS architectures 800, 900, 1000, 1100 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 12:
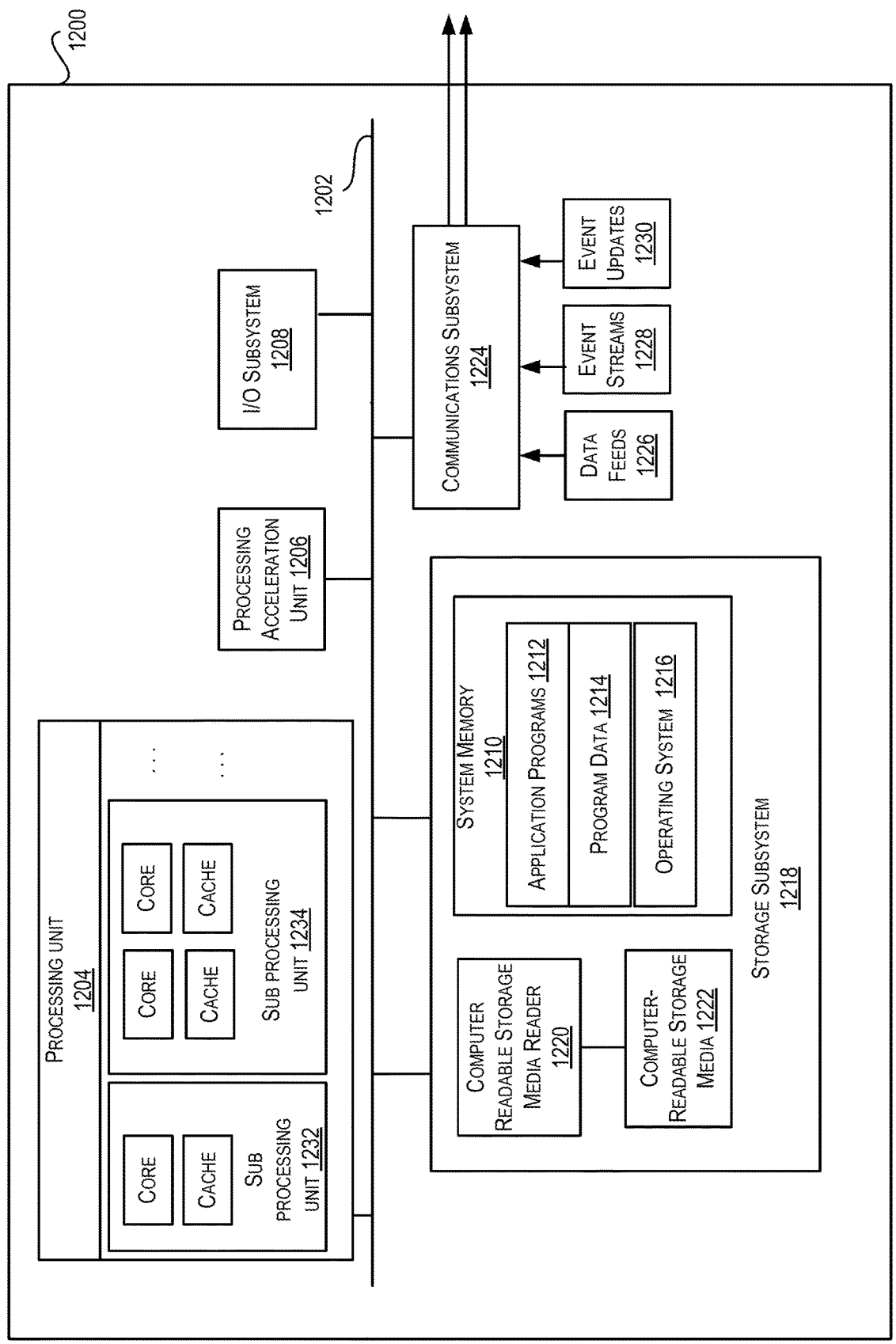
FIG. 12 is a block diagram illustrating an example computer system, according to at least one embodiment.

FIG. 12 illustrates an example computer system 1200, in which various embodiments may be implemented. The computer system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may include a storage subsystem 1218 that includes software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program services that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems.

Storage subsystem 1218 may also provide a tangible computer-readable storage medium for storing the basic programming and data constructs that provide the functionality of some embodiments. Software (programs, code services, instructions) that when executed by a processor provide the functionality described above may be stored in storage subsystem 1218. These software services or instructions may be executed by processing unit 1204. Storage subsystem 1218 may also provide a repository for storing data used in accordance with the present disclosure.

Storage subsystem 1218 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 1200.

By way of example, computer-readable storage media 1222 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program services, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments, communications subsystem 1224 can include radio frequency (RF) transceiver components for accessing wireless voice and/or data networks (e.g., using cellular telephone technology, advanced data network technology, such as 3G, 4G, 5G or EDGE (enhanced data rates for global evolution), WiFi (IEEE 802.11 family standards, or other mobile communication technologies, or any combination thereof)), global positioning system (GPS) receiver components, and/or other components. In some embodiments, communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "including," "having," "including," and "containing" are to be construed as open-ended terms (i.e., meaning "including, but not limited to,") unless otherwise noted. The term "connected" is to be construed as a partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:

obtaining, by a synthetic data generation system (SDGS), a result of performing optical character recognition (OCR) on an input document image comprising text comprising a plurality of content items having a plurality of values, respectively, the result comprising information indicative of the plurality of values and information identifying, for each of the plurality of values, a location within the input document image of a content item from the plurality of content items that corresponds to a value of the plurality of values, wherein the plurality of content items comprises a first content item and the plurality of values comprises a value corresponding to the first content item, wherein the obtaining the result of the OCR comprises:
dividing the text into text units by performing the OCR on the text, each of the text units corresponding to one of the plurality of content items and is enclosed by a bounding box, and
extracting the text units and location information of four corners of each bounding box as the location of each of the plurality of content items, the location information comprising x, y coordinates of the four corners;

receiving, by the SDGS, an annotation to the result, the annotation indicating that the value from the plurality of values is associated with a first key;

determining, by the SDGS, a plurality of synthetic values for the first key, the plurality of synthetic values comprising a first synthetic value different from the value and a second synthetic value different from the value and from the first synthetic value;

generating, by the SDGS, a plurality of synthetic document images including:
a first synthetic document image comprising a first set of content items including the first content item and one or more second content items from the plurality of content items, wherein the first synthetic document image includes the first synthetic value for the first content item, and, for the one or more second content items, one or more second values from the plurality of values that correspond to the one or more second content items and were included in the input document image, and
  a second synthetic document image comprising a second set of content items including the first content item and one or more third content items from the plurality of content items, wherein the second synthetic document image includes the second synthetic value for the first content item, and, for the one or more third content items, one or more third values from the plurality of values that correspond to the one or more third content items and were included in the input document image; and
generating, by the SDGS, a plurality of annotation data for the plurality of synthetic document images, the plurality of annotation data including:
  first annotation data for the first synthetic document image, the first annotation data comprising, for each content item in the first set of content items, information indicative of a corresponding value included in the first synthetic document image, and information identifying a corresponding location within the first synthetic document image of the content item, and
  second annotation data for the second synthetic document image, the second annotation data comprising, for each content item in the second set of content items, information indicative of a corresponding value included in the second synthetic document image, and information identifying a corresponding location within the second synthetic document image of the content item,
wherein the method further comprises:
  generating a plurality of synthetic training datapoints, each of the plurality of synthetic training datapoints comprising a corresponding synthetic document image among the plurality of synthetic document images and associated annotation data among the plurality of annotation data; and
  outputting the plurality of synthetic training datapoints to another computer system configured to train a machine learning (ML) model using the plurality of synthetic training datapoints and generate the trained ML model, wherein the trained ML model is configured to, based on a provided document image as an input, (1) identify a certain key in the provided document image and (2) identify a value in the provided document image that corresponds to the certain key.

2. The method of claim 1, wherein:
the determining the plurality of synthetic values comprises determining the first synthetic value and the second synthetic value using a key-value (KV) content database that stores a plurality of historical values,
each of the plurality of historical values in the KV content database is associated with one of a plurality of historical keys, to form historical KV pairs, and
the first key is one of the plurality of historical keys.

3. The method of claim 2, further comprising:
searching the KV content database to identify historical values corresponding to the first key among the plurality of historical values,
wherein the first synthetic value and the second synthetic value are the identified historical values.

4. The method of claim 1, wherein:
the receiving the annotation to the result comprises receiving a plurality of annotations, the plurality of annotations indicating that values corresponding to some of the plurality of content items are associated with a plurality of particular keys, and
the method further comprises:
  prior to the determining the plurality of synthetic values for the first key, receiving, by the SDGS, a user input for specifying the first key as a key for which the plurality of synthetic values are to be determined and the plurality of synthetic document images are to be generated.

5. The method of claim 1, further comprising:
receiving, by the SDGS, a user input for specifying a number of the plurality of synthetic training datapoints to be generated.

6. The method of claim 1, wherein the generating the plurality of synthetic document images comprises:
inserting, into at least one from among the first synthetic document image and the second synthetic document image, a background image.

7. The method of claim 6, wherein the background image is a logo.

8. The method of claim 1, wherein the generating the plurality of synthetic document images comprises:
changing, for at least one from among the first synthetic document image and the second synthetic document image, at least one from among a font size and a font style.

9. The method of claim 1, wherein:
the input document image includes one from among a receipt image and an invoice image, and
the generating the plurality of synthetic document images comprises generating the plurality of synthetic document images corresponding to the one from among the receipt image and the invoice image.

10. The method of claim 1, wherein the obtaining the result of the OCR on the input document image further comprises:
obtaining an OCR image including rows, each of the rows including one of the plurality of content items and location information corresponding to the one of the plurality of content items.

11. The method of claim 10, wherein the receiving the annotation comprises obtaining the OCR image to which the first key is added in correspondence to the first content item located in one of the rows.

12. The method of claim 11, further comprising:
prior to the generating the plurality of synthetic document images, generating, by the SDGS, a template based on the OCR image to which the first key is added, the generating the template comprising masking the value corresponding to the first content item in the one of the rows, and generating the template comprising, in the one of the rows, the first key, an empty value field corresponding to the masked value, and location information corresponding to the first content item,
wherein the generating the first synthetic document image comprises:
  associating the first synthetic value with the empty value field, to generate a first synthetic template, based on which the first synthetic document image is generated, and associating the second synthetic value with the empty value field, to generate a second synthetic template, based on which the second synthetic document image is generated.

13. The method of claim 1, wherein the generating the plurality of synthetic document images comprises generating the plurality of synthetic document images in parallel, partially in parallel, or successively.

14. The method of claim 1, wherein:
the trained ML model is configured to identify the certain key from a predefined set of keys, and
the predefined set of keys is identified during training of the ML model using the plurality of synthetic training datapoints.

15. The method of claim 1, further comprising:
receiving a user selection input through a user interface, the user selection input providing a selection of a set of keys,
wherein the certain key is a key included in the set of keys.

16. A non-transitory computer-readable medium storing computer-executable instructions that, when executed by one or more computer systems of a synthetic data generation system (SDGS), cause the SDGS to perform a method including:
obtaining a result of performing optical character recognition (OCR) on an input document image comprising text comprising a plurality of content items having a plurality of values, respectively, the result comprising information indicative of the plurality of values and information identifying, for each of the plurality of values, a location within the input document image of a content item from the plurality of content items that corresponds to a value of the plurality of values, wherein the plurality of content items comprises a first content item and the plurality of values comprises a value corresponding to the first content item,
wherein the obtaining the result of the OCR includes:
dividing the text into text units by performing the OCR on the text, each of the text units corresponding to one of the plurality of content items and is enclosed by a bounding box, and
extracting the text units and location information of four corners of each bounding box as the location of each of the plurality of content items, the location information comprising x, y coordinates of the four corners;
receiving an annotation to the result, the annotation indicating that the value from the plurality of values is associated with a first key;
determining a plurality of synthetic values for the first key, the plurality of synthetic values comprising a first synthetic value different from the value and a second synthetic value different from the value and from the first synthetic value;
generating a plurality of synthetic document images including:
a first synthetic document image comprising a first set of content items including the first content item and one or more second content items from the plurality of content items, wherein the first synthetic document image includes the first synthetic value for the first content item, and, for the one or more second content items, one or more second values from the plurality of values that correspond to the one or more second content items and were included in the input document image, and
a second synthetic document image comprising a second set of content items including the first content item and one or more third content items from the plurality of content items, wherein the second synthetic document image includes the second synthetic value for the first content item, and, for the one or more third content items, one or more third values from the plurality of values that correspond to the one or more third content items and were included in the input document image; and
generating a plurality of annotation data for the plurality of synthetic document images, the plurality of annotation data including:
first annotation data for the first synthetic document image, the first annotation data comprising, for each content item in the first set of content items, information indicative of a corresponding value included in the first synthetic document image, and information identifying a corresponding location within the first synthetic document image of the content item, and
second annotation data for the second synthetic document image, the second annotation data comprising, for each content item in the second set of content items, information indicative of a corresponding value included in the second synthetic document image, and information identifying a corresponding location within the second synthetic document image of the content item,
wherein the method further includes:
generating a plurality of synthetic training datapoints, each of the plurality of synthetic training datapoints comprising a corresponding synthetic document image among the plurality of synthetic document images and associated annotation data among the plurality of annotation data; and
outputting the plurality of synthetic training datapoints to another computer system configured to train a machine learning (ML) model using the plurality of synthetic training datapoints and generate the trained ML model, wherein the trained ML model is configured to, based on a provided document image as an input, (1) identify a certain key in the provided document image and (2) identify a value in the provided document image that corresponds to the certain key.

17. The non-transitory computer-readable medium of claim 16, wherein:
the determining the plurality of synthetic values includes determining the first synthetic value and the second synthetic value using a key-value (KV) content database that stores a plurality of historical values,
each of the plurality of historical values in the KV content database is associated with one of a plurality of historical keys, to form historical KV pairs, and
the first key is one of the plurality of historical keys.

18. The non-transitory computer-readable medium of claim 17, wherein:
the method further includes searching the KV content database to identify historical values corresponding to the first key among the plurality of historical values, wherein the first synthetic value and the second synthetic value are the identified historical values.

19. The non-transitory computer-readable medium of claim 16, wherein:
the receiving the annotation to the result includes receiving a plurality of annotations, the plurality of annotations indicating that values corresponding to some of the plurality of content items are associated with a plurality of particular keys, and the method further includes:

prior to the determining the plurality of synthetic values for the first key, receiving a user input for specifying the first key as a key for which the plurality of synthetic values are to be determined and the plurality of synthetic document images are to be generated.

20. A system comprising:

one or more computer systems configured to perform a method including:

obtaining a result of performing optical character recognition (OCR) on an input document image comprising text comprising a plurality of content items having a plurality of values, respectively, the result comprising information indicative of the plurality of values and information identifying, for each of the plurality of values, a location within the input document image of a content item from the plurality of content items that corresponds to a value of the plurality of values, wherein the plurality of content items comprises a first content item and the plurality of values comprises a value corresponding to the first content item, wherein the obtaining the result of the OCR includes:

dividing the text into text units by performing the OCR on the text, each of the text units corresponding to one of the plurality of content items and is enclosed by a bounding box, and extracting the text units and location information of four corners of each bounding box as the location of each of the plurality of content items, the location information comprising x, y coordinates of the four corners;

receiving an annotation to the result, the annotation indicating that the value from the plurality of values is associated with a first key;

determining a plurality of synthetic values for the first key, the plurality of synthetic values comprising a first synthetic value different from the value and a second synthetic value different from the value and from the first synthetic value;

generating a plurality of synthetic document images including:

a first synthetic document image comprising a first set of content items including the first content item and one or more second content items from the plurality of content items, wherein the first synthetic document image includes the first synthetic value for the first content item, and, for the one or more second content items, one or more second values from the plurality of values that correspond to the one or more second content items and were included in the input document image, and a second synthetic document image comprising a second set of content items including the first content item and one or more third content items from the plurality of content items, wherein the second synthetic document image includes the second synthetic value for the first content item, and, for the one or more third content items, one or more third values from the plurality of values that correspond to the one or more third content items and were included in the input document image; and generating a plurality of annotation data for the plurality of synthetic document images, the plurality of annotation data including:

first annotation data for the first synthetic document image, the first annotation data comprising, for each content item in the first set of content items, information indicative of a corresponding value included in the first synthetic document image, and information identifying a corresponding location within the first synthetic document image of the content item, and second annotation data for the second synthetic document image, the second annotation data comprising, for each content item in the second set of content items, information indicative of a corresponding value included in the second synthetic document image, and information identifying a corresponding location within the second synthetic document image of the content item, wherein the method further includes:

generating a plurality of synthetic training datapoints, each of the plurality of synthetic training datapoints comprising a corresponding synthetic document image among the plurality of synthetic document images and associated annotation data among the plurality of annotation data; and outputting the plurality of synthetic training datapoints to another computer system configured to train a machine learning (ML) model using the plurality of synthetic training datapoints and generate the trained ML model, wherein the trained ML model is configured to, based on a provided document image as an input, (1) identify a certain key in the provided document image and (2) identify a value in the provided document image that corresponds to the certain key.

* * * * *

UNITED STATES PATENT AND TRADEMARK OFFICE
CERTIFICATE OF CORRECTION

| | | |
|---|---|---|
| PATENT NO. | : 12,374,139 B2 | Page 1 of 1 |
| APPLICATION NO. | : 18/058982 | |
| DATED | : July 29, 2025 | |
| INVENTOR(S) | : Hu et al. | |

It is certified that error appears in the above-identified patent and that said Letters Patent is hereby corrected as shown below:

In the Specification

In Column 7, Line 46, delete "models models" and insert -- models—models --, therefor.

In Column 19, Line 25, delete "("Item TotalPrice" and insert -- ("ItemTotalPrice --, therefor.

Signed and Sealed this
Sixteenth Day of December, 2025

John A. Squires
*Director of the United States Patent and Trademark Office*